(12) United States Patent
Kida et al.

(10) Patent No.: US 7,971,304 B2
(45) Date of Patent: Jul. 5, 2011

(54) OPTICAL FIBER CONNECTOR CLEANER, AND METHOD OF CLEANING OPTICAL FIBER CONNECTOR CONNECTION SURFACE

(75) Inventors: Takahisa Kida, Tokyo (JP); Katsuhisa Taguchi, Shiroi (JP)

(73) Assignee: Seikoh Giken Co., Ltd., Chiba (JP)

( * ) Notice: Subject to any disclaimer, the term of this patent is extended or adjusted under 35 U.S.C. 154(b) by 1377 days.

(21) Appl. No.: 10/568,076

(22) PCT Filed: Jul. 9, 2004

(86) PCT No.: PCT/JP2004/009830
§ 371 (c)(1),
(2), (4) Date: Feb. 13, 2006

(87) PCT Pub. No.: WO2005/017590
PCT Pub. Date: Feb. 24, 2005

(65) Prior Publication Data
US 2007/0023067 A1    Feb. 1, 2007

(30) Foreign Application Priority Data

Aug. 13, 2003 (JP) .................. 2003-293006
Nov. 28, 2003 (JP) .................. 2003-400172

(51) Int. Cl.
*A47L 25/00* (2006.01)
*B08B 11/00* (2006.01)
(52) U.S. Cl. .................. 15/97.1; 15/210.1
(58) Field of Classification Search .......... 15/97.1, 15/210.1
See application file for complete search history.

(56) References Cited

U.S. PATENT DOCUMENTS

| 5,325,452 | A | 6/1994 | Stein et al. |
| 5,557,696 | A | 9/1996 | Stein |
| 5,735,013 | A | 4/1998 | Yaguchi et al. |
| 5,836,031 | A * | 11/1998 | Cox .................. 15/104.002 |
| 6,209,163 | B1 | 4/2001 | Clairadin et al. |

(Continued)

FOREIGN PATENT DOCUMENTS

EP    0391111 A1    10/1990

(Continued)

OTHER PUBLICATIONS

Machine Translation: JP 09-197182A to Tanabe, et al. Jul. 1997.*

(Continued)

*Primary Examiner* — Randall Chin
(74) *Attorney, Agent, or Firm* — Blank Rome LLP

(57) ABSTRACT

An optical fiber connector cleaner (1) comprises a housing (10), a winding means (32) and a delivery means (34) for a cleaning tape (T) which are disposed in the housing, a cleaning means (20) having a bar-like cleaning section (21) projecting outwardly of the housing, on the front-end of the cleaning section the cleaning tape delivered from the delivery means being movably mounted under tension in an exposed state, the front-end of the cleaning section being brought into contact with the end surface of an optical fiber connector to thereby clean the end surface, a cleaning section rotating means (23) coaxially connected to the cleaning section in the housing and rotatably supported with respect to the housing; and a transmission means (40) which rotates the winding means and the cleaning section rotating means substantially simultaneously in a predetermined direction through a predetermined angle and then reverses the cleaning section rotating means to its original position.

27 Claims, 24 Drawing Sheets

U.S. PATENT DOCUMENTS

| | | | |
|---|---|---|---|
| 6,758,605 B1 * | 7/2004 | Villemaire et al. | 385/85 |
| 6,839,935 B2 * | 1/2005 | Kiani et al. | 15/345 |
| 6,854,152 B2 * | 2/2005 | Loder et al. | 15/210.1 |
| 7,216,393 B2 * | 5/2007 | Sato et al. | 15/210.1 |
| 7,243,390 B2 * | 7/2007 | Fujiwara et al. | 15/97.1 |

FOREIGN PATENT DOCUMENTS

| | | |
|---|---|---|
| GB | 2 359 737 A | 9/2001 |
| JP | 09 197182 A | 7/1997 |
| JP | 09-285766 | 11/1997 |
| JP | 09 285766 A | 11/1997 |
| JP | 2000-284147 | 10/2000 |
| JP | 2002-090576 | 3/2002 |
| JP | 2002090576 A | 3/2002 |

OTHER PUBLICATIONS

International Search Report, Oct. 12, 2004.

JP Patent Laid Open 09-197182, Jul. 31, 1997, NEC Miyagi Ltd NEC Corp.

Official Action issued on May 8, 2007 in the counterpart Japanese application.

* cited by examiner

FIG.3
(a)
(b)
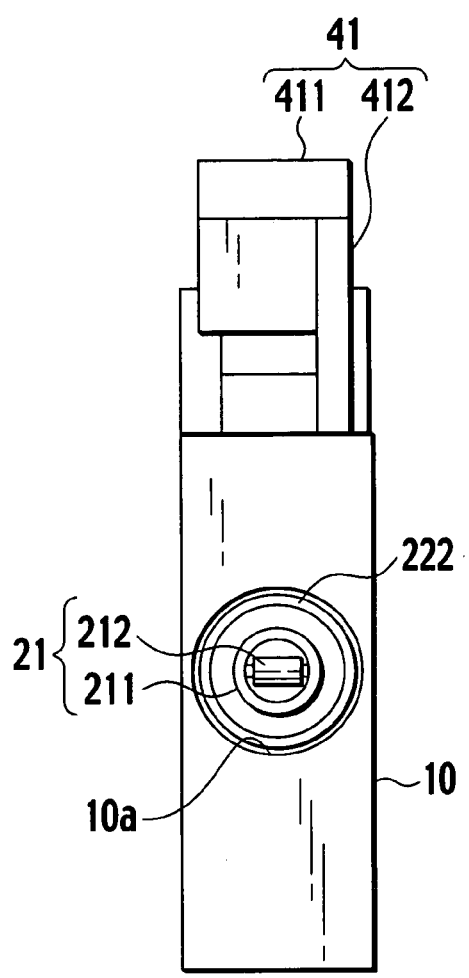
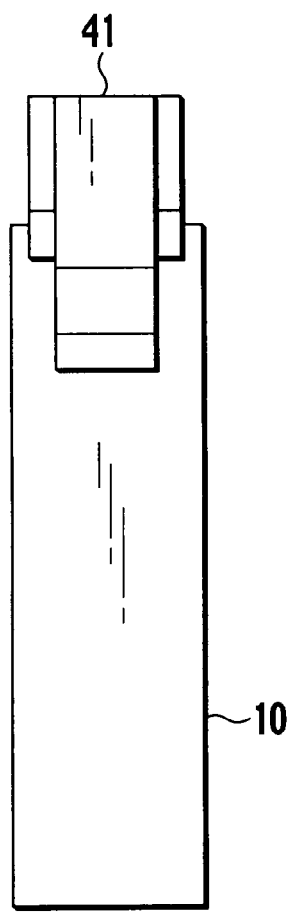

FIG.5
(a) 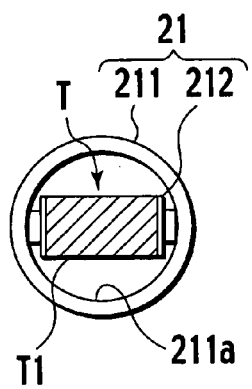
(b) 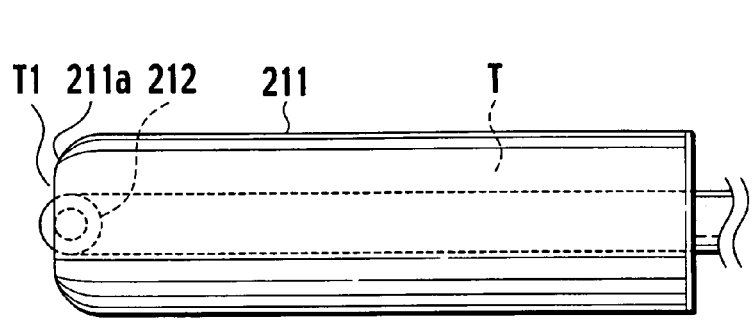
FIG.6
(a) 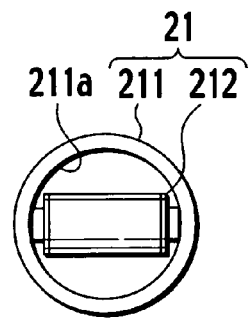
(b) 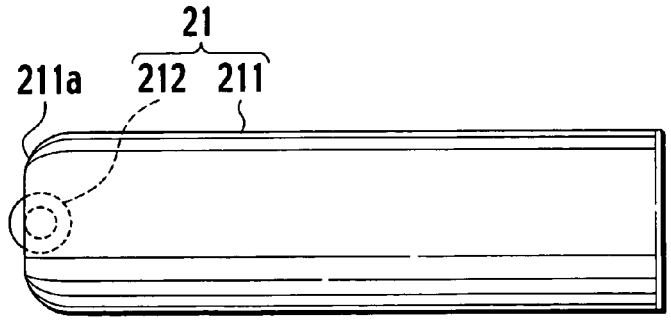

OPTICAL FIBER CONNECTOR CLEANER, AND METHOD OF CLEANING OPTICAL FIBER CONNECTOR CONNECTION SURFACE

TECHNICAL FIELD

The present invention relates to a cleaner used for cleaning the ferrule end surface (connection surface) of an optical fiber connector incorporated in optical communications equipment and the like. More specifically, the present invention relates to a cleaner suitable for cleaning the ferrule end surface of an optical fiber connector when mounted in an adapter.

BACKGROUND TECHNOLOGY

An optical fiber connector incorporated in equipment used in connection with optical communications equipment is frequently connected and detached. Accordingly, when such a connector is detached grease or dust or the like can become stuck to the end surface of the optical fiber connector which leads to a decrease in transmission performance. When the optical fiber connector is attached or detached the ferrule end surface must be cleaned.

However, a connector that is on the insertion and attachment side, that is to say the side that is inserted (male side), is relatively easy to clean as the end surface thereof is exposed, while the insert receive side (female side) of a connector incorporated in an equipment is difficult to clean, because a connecting adapter is attached to the female side of the connector and the end surface to be cleaned is far back from the adapter. Thus, a variety of different cleaning tools (for example Japanese Patent No. 3350850, Japanese Unexamined Patent Application Publication No. H9-285766) have been proposed, however these do not provide a tool with superior cleaning properties suitable for practical use and normally a cotton applicator of a cleaning fiber wrapped around the end of a bar-like member is used as a cleaning tool.

A cleaning tool such as the cotton applicator is subject to deficiencies. It is difficult for cleaning to be performed uniformly, and differences arise from cleaning operation to cleaning operation and between individual operators. Using such a cotton applicator tool a substantial amount of time is required for cleaning a device such as optical communications equipment in which a large number of connectors is incorporated and substantial insertion loss results when the cleaning fiber becomes detached during a cleaning operation.

DISCLOSURE OF THE INVENTION

With the foregoing in view it is an object of the present invention to provide an optical fiber connector cleaner having superior cleaning properties and operability, that can definitively clean both the male terminal and the female terminal of an optical fiber connector.

In order to realize this object, according to a first aspect of the present invention an optical fiber connector cleaner is provided comprising: a housing; a cleaning tape winding means and cleaning tape delivery means arranged inside the housing; a cleaning means having a bar-like cleaning section projecting outwardly from the housing, on the front-end of the cleaning section the cleaning tape delivered from the delivery means being movably mounted under tension in an exposed state, the front-end of the cleaning section being brought into contact with the end surface of an optical fiber connector to thereby clean the end surface; a cleaning section rotating means coaxially connected to the cleaning section in the housing and rotatably supported with respect to the housing; and a transmission means which rotates the winding means and the cleaning section rotating means substantially simultaneously in a predetermined direction through a predetermined angle and then reverses the cleaning section rotating means to its original position.

According to another aspect of the present invention an optical fiber connector cleaner is provided comprising: a housing; a cleaning tape winding means and cleaning tape delivery means arranged inside the housing; a cleaning means having a bar-like cleaning section projecting outwardly from the housing, on the front-end of the cleaning section the cleaning tape delivered from the delivery means being movably mounted under tension in an exposed state, the front-end of the cleaning section being brought into contact with the end surface of an optical fiber connector to thereby clean the end surface; a cleaning section rotating means coaxially connected to the cleaning section in the housing and rotatably supported in relation to the housing; a cleaning tape guide means coaxially connected to the cleaning section and rotatably supported in relation to the housing; and a transmission means which rotates the winding means and the cleaning section rotating means substantially simultaneously in the respective predetermined directions through the respective predetermined angles and then reverses the cleaning section rotating means to its original position.

According to yet another aspect of the present invention an optical fiber connector cleaner is provided wherein the transmission means rotates the winding means, the delivery means and the cleaning tape rotating means substantially simultaneously.

According to yet another aspect of the present invention an optical fiber connector cleaner is provided wherein the cleaning section includes a hollow bar-like member and a smooth member arranged at the end of the bar-like member.

According to yet another aspect of the present invention an optical fiber connector cleaner is provided wherein the cleaning section includes a hollow bar-like member and a roller rotatably mounted at the end of that bar-like member.

According to yet another aspect of the present invention an optical fiber connector cleaner is provided wherein the main part of the cleaning section is a solid bar-like member.

According to yet another aspect of the present invention an optical fiber connector cleaner is provided wherein the cleaning tape is cloth that has been subject to a fuzz prevention process.

According to yet another aspect of the present invention an optical fiber connector cleaner is provided wherein the cleaning tape is a woven cloth that has been subject to a fuzz prevention process.

According to yet another aspect of the present invention an optical fiber connector cleaner is provided wherein the transmission means includes an arm that rises and lowers in vertical direction, and the transmission means is configured such that due to the downward movement of the arm the winding means is rotated to a first angle in a first direction while simultaneously the cleaning section rotating means is rotated to a second angle in a second direction, moreover due to the upward movement of the arm the cleaning part rotating means is rotated to the second angle in the opposite direction to the second direction.

According to yet another aspect of the present invention an optical fiber connector cleaner is provided wherein the transmission means includes an arm that rises and lowers in vertical direction, and the transmission means is configured such that due to the downward movement of the arm the winding means is rotated to a first angle in a first direction while the cleaning section rotating means is rotated to a second angle in a second direction and simultaneously therewith, the delivery means is rotated to the first angle in a third direction, moreover due to the upward movement of the arm the cleaning part rotating means is rotated to the second angle in the opposite direction to the second direction.

According to yet another aspect of the present invention an optical fiber connector cleaner is provided wherein the arm of the transmission means has a plurality of notches formed along the longitudinal direction thereof, the cleaning section rotating means has a plurality of protrusions disposed on the external peripheral surface thereof, and when the arm descends the protrusions of the cleaning section rotating means are pushed down in succession by the notches on the arm and the cleaning part rotating means rotates at a determined angle in a determined direction, while when the arm ascends the protrusions of the cleaning section rotating means are pushed up in succession by the notches on the arm and the cleaning section rotating means rotates at a determined angle opposite to that determined direction.

According to yet another aspect of the present invention an optical fiber connector cleaner is provided wherein the arm of the transmission means includes a rack having a plurality of notched grooves, the cleaning part rotating means includes a pinion having a plurality of teeth that engage with the rack, and the cleaning section rotating means rotates in a determined direction or in a direction opposite thereto in response to the ascent or decent of the arm.

According to yet another aspect of the present invention a method for cleaning the end surface of a ferrule of an optical fiber connector is provided comprising the steps of: bringing the surface of a cleaning tape into contact with the end surface of a ferrule of an optical fiber connector; moving the cleaning tape a uniform distance only, in the longitudinal direction thereof; and rotating the cleaning tape over the connecting surface of the optical fiber connector while the cleaning tape is moving.

According to yet another aspect of the present invention a method for cleaning the end surface of a ferrule of an optical fiber connector is provided comprising the steps of: inserting into an optical fiber connector, the end of a cleaning section on which a cleaning tape is movably mounted under tension; bringing the cleaning tape at the end of the cleaning section into contact with the end surface of a ferrule of the optical fiber connector; and rotating as well as moving the cleaning tape while the cleaning tape is brought into contact with the end surface of the ferrule.

According to yet another aspect of the present invention an optical fiber connector cleaner is provided comprising: a housing of a size that can be held in one hand; a bar-like cleaning section disposed at the end of the housing and having an axis of extension; a winding means and a delivery means arranged inside the housing; a cleaning tape that is wound up by the winding means after being delivered from the delivery means and being wound around the end of the cleaning section; a cleaning section rotating means that rotates the cleaning section a determined amount about the axis of extension; and a manual operating part that drives the cleaning section rotating means simultaneously with driving the winding means, wherein the cleaning section includes a bar-like inner guide member around the side surfaces and end section of which the cleaning tape is arranged, and an outer side guide member that encompasses the inner guide member and the outside of the cleaning tape with the end of the inner guide member exposed, the inner guide member and the outer guide member are biased to the direction of the end of the housing, independent of each other.

According to yet another aspect of the present invention an optical fiber connector cleaner is provided wherein the cleaning section is supported at the base by a shaft disposed in the housing, and can rotate about the shaft at a determined angle in relation to the housing.

According to yet another aspect of the present invention an optical fiber connector cleaner is provided wherein the optical fiber connector cleaner has a cover that can be attached to and removed from the cleaning section, the cover includes a tubular part having an insertion hole that can accommodate the insertion of a terminal of the male side of a connector.

According to yet another aspect of the present invention an optical fiber connector cleaner is provided wherein the cover includes a cap that covers the insertion hole.

According to yet another aspect of the present invention an optical fiber connector cleaner is provided comprising: a housing; a cleaning section disposed at one end of the housing, said cleaning section including a bar-like member rotatably supported in the housing about the axis of extension A of the bar-like member, the cleaning tape being supported at the end of the bar-like member in an exposed state so as to be capable of movement in the lengthwise direction of a cleaning tape; a movable operating part disposed in the housing; a cleaning section rotation drive means that is connected to the bar-like member and the operating part and rotates the bar-like member about the axis of extension in response to movement of the operating part; and a winding means that is connected to the operating part, that winds the cleaning tape in response to movement of the operating part and that advances the cleaning tape at the end of the bar-like member.

According to yet another aspect of the present invention an optical fiber connector cleaner is provided wherein the cleaning section rotating drive means rotates the bar-like member in the forward direction of the rotation of the axis of extension in response to a first movement of the operating part and rotates the bar-like member in the backward direction returning the bar-like member to their original position in response to a second movement of the operating part, wherein the winding means has a winding part rotatably supported in the housing that winds the cleaning tape, this winding part rotating in a predetermined direction to wind the cleaning tape in response to either the first or the second movement of the operating part, advancing the cleaning tape at the end of the bar-like member.

According to yet another aspect of the present invention an optical fiber connector cleaner is provided wherein the cleaning section rotating drive means includes a pinion disposed at the base of the bar-like member and a rack that engages with the pinion, disposed on the operating part.

According to yet another aspect of the present invention an optical fiber connector cleaner is provided wherein the winding means includes: a winding part rotatably supported on a shaft disposed in the housing, that winds the cleaning tape, a first rotation drive plate and a second rotation drive plate rotatably supported on the shaft, arranged along the axis of extension of the shaft on the respective sides of the winding part, a first ratchet mechanism disposed between the winding part and the first rotation drive plate, and a second ratchet mechanism disposed between the winding part and the second rotation drive plate, wherein the first and second ratchet mechanisms convey to the winding part only a rotation in a first rotational direction turning around that shaft.

According to yet another aspect of the present invention an optical fiber connector cleaner is provided wherein the winding means includes a movable member that moves in response to movement of the operating part, the movable member including a first rack that engages a first pinion disposed on the first rotation drive plate and a second rack that engages a second pinion disposed on the second rotation drive plate, the first and second racks operating in response to movement of the operating part, to engage the first and second pinions respectively so as to rotate the first and second rotation drive plates in mutually opposite directions.

According to yet another aspect of the present invention an optical fiber connector cleaner is provided wherein the cleaning section rotation drive means includes a spring connecting the pinion and the bar-like member respectively.

According to yet another aspect of the present invention an optical fiber connector cleaner is provided wherein the cleaning section includes: a guide sleeve respectively that supports the bar-like member, the guide sleeve being rotatably supported in the housing so as to change the angle of the axis of extension in relation to the longitudinal axis of the housing.

According to yet another aspect of the present invention an optical fiber connector cleaner is provided wherein the cleaning section includes: a tubular guide sleeve rotatably supported in the housing; and a tubular external guide member supported so as to be capable of sliding along the axis of extension along the inner side surface of the guide sleeve and that accommodates the bar-like member and the cleaning tape such that the bar-like member and the cleaning tape are capable of sliding along the axis of extension, the bar-like member is connected to the cleaning section rotation drive means via a connecting member thereby enabling it to receive rotational driving force from the cleaning section rotation drive means, and the external guide member has an engaging part capable of engaging with a stepped part formed in the guide sleeve and is biased in the direction toward the end of the bar-like members along the axis of extension by spring disposed between the external guide member and the bar-like member such that the stepped part and the engaging part engage together.

According to yet another aspect of the present invention an optical fiber connector cleaner is provided wherein the cleaning section includes: a tubular guide sleeve rotatably supported in the housing; a tubular external guide member supported so as to be capable of sliding along the axis of extension in the inner side surface of the guide sleeve and that accommodates the bar-like member and the cleaning tape such that the bar-like member and the cleaning tape are capable of sliding along the axis of extension; and a rotary joint supported at the base of the guide sleeve so as to be capable of rotating about the axis of extension, that engages the base of the bar-like member such that the rotation joint and the bar-like member can not move relatively to each other in the circular direction in relation to that axis of extension and can slide along that axis of extension, the rotation joint means is connected to the cleaning section rotation drive means via a connecting member so as to receive rotational driving force from the cleaning section rotation drive means, the bar-like member has a flange capable of engaging with an engaging part disposed in the guide sleeve, and is biased in the direction towards the end of the bar-like member along the axis of extension by a spring disposed between the bar-like member flange and the rotation joint such that the bar-like member flange engages with the engaging part, and the external guide member has a flange capable of engaging with the stepped part formed in the guide sleeve, and is biased in the direction towards the end of the bar-like member along the axis of extension by a spring disposed between the external guide member flange and the engaging part of the guide sleeve such that the external guide member flange engages with the stepped part.

According to yet another aspect of the present invention an optical fiber connector cleaner is provided wherein the housing has a long slender form.

According to yet another aspect of the present invention an optical fiber connector cleaner is provided wherein the cleaning section rotation drive means is mechanically connected to the bar-like member and the operating part, and the winding means is mechanically connected to the operating part.

According to the present invention, an optical fiber connector cleaner is provided having superior operability and cleaning effects and that can definitively clean to both the male terminal and the female terminal sides of an optical fiber connector.

BRIEF DESCRIPTION OF THE DRAWINGS

FIG. 3 (a) is a front view from the direction indicated by the arrow IIIA in FIG. 1, FIG. 3 (b) is a rear view from the direction of the arrow IIIB of FIG. 1;

FIGS. 5 (a) and (b) are expanded views of the cleaning section shown in FIG. 1;

FIGS. 6 (a) and (b) are expanded views of the cleaning section of FIG. 5 with tape removed;

BEST MODES FOR IMPLEMENTING THE INVENTION

Figure 1:
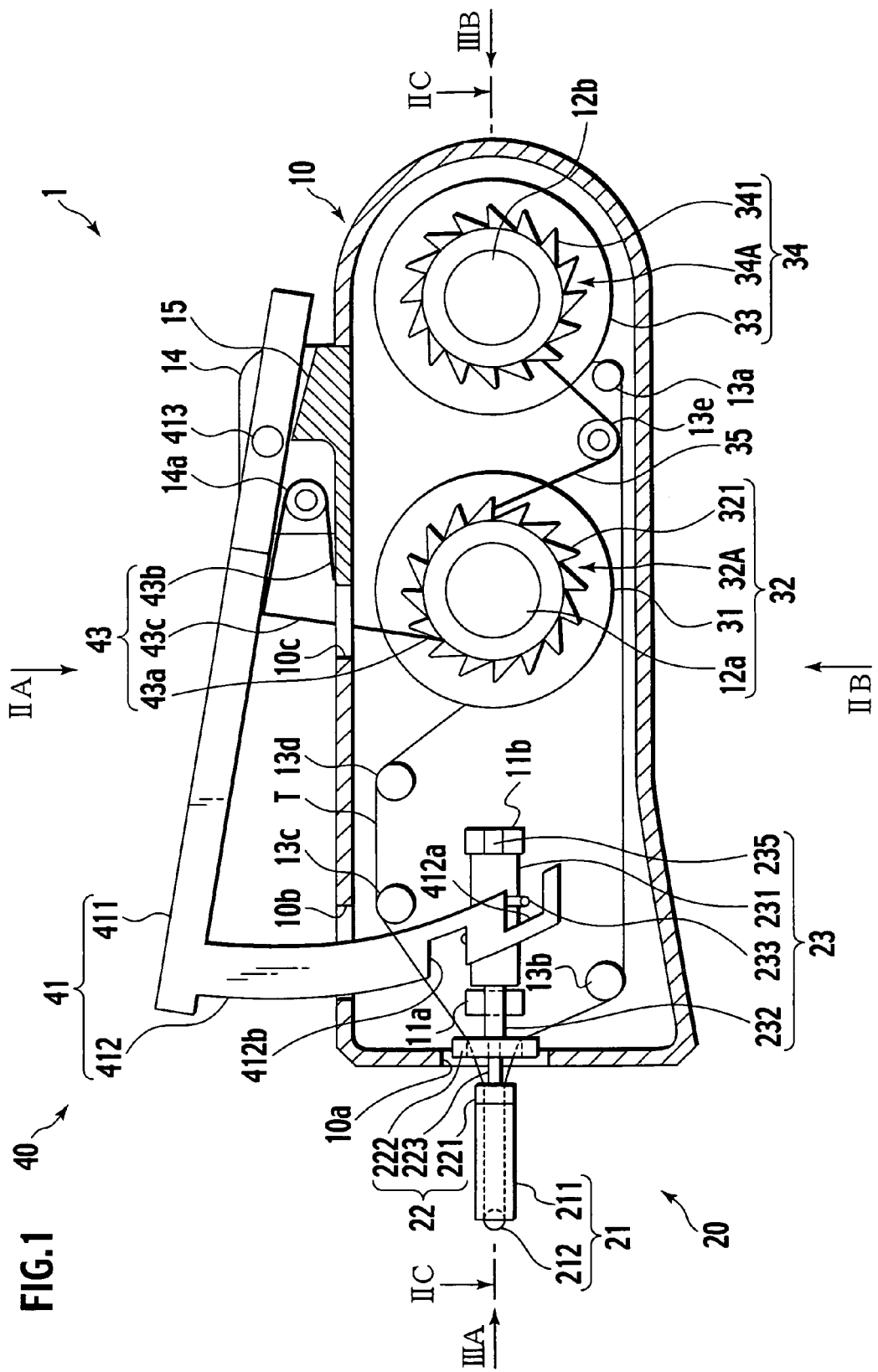
FIG. 1 is a plan view of an optical fiber connector cleaner according to a first embodiment of the present invention, with the top lid removed.
Figure 2:
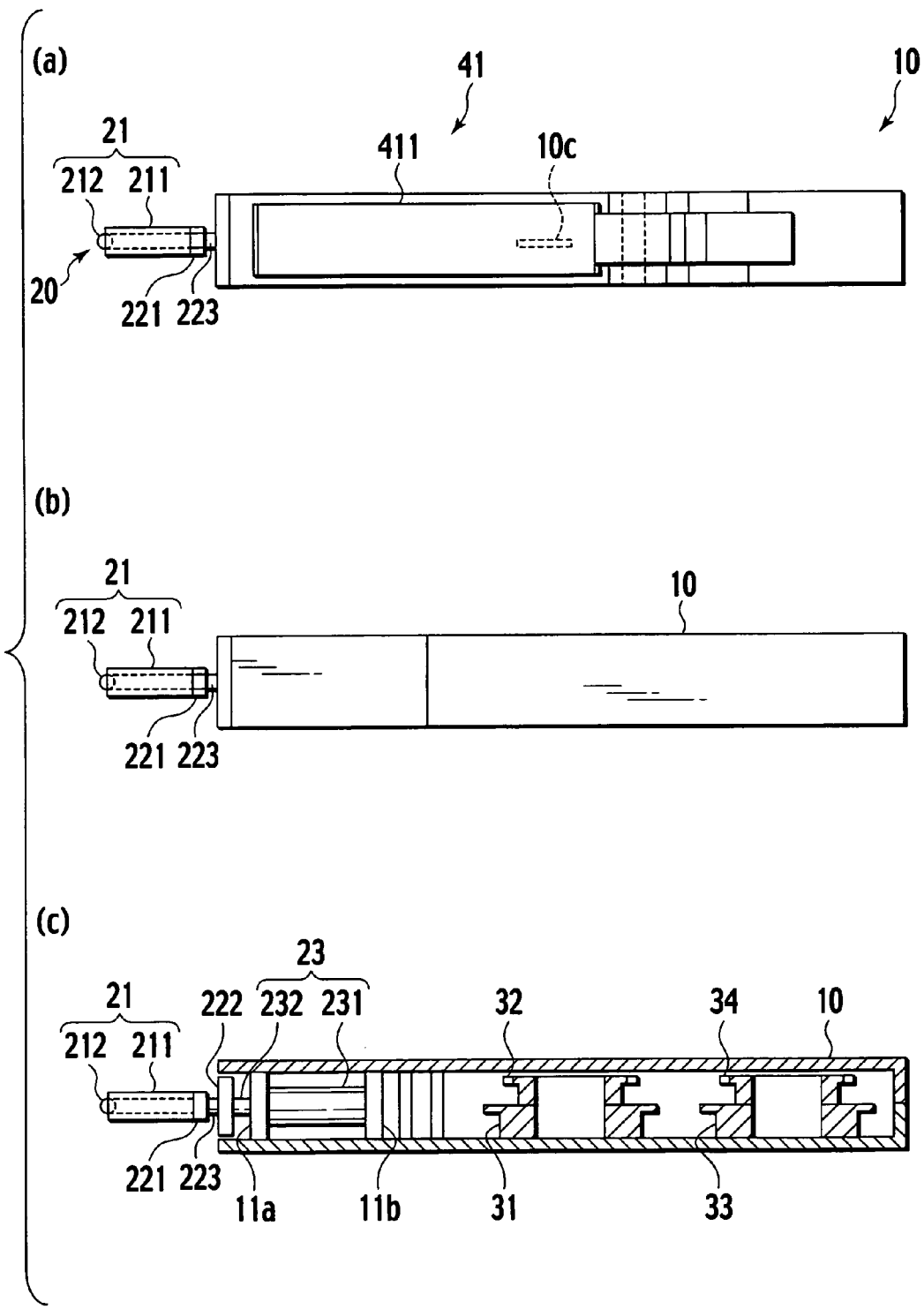
FIG. 2 (a) is a side view from the direction indicated by the arrow IIA of FIG. 1, FIG. 2 (b) is a side view from the direction indicated by the arrow IIB in FIG. 1 and FIG. 2 (c) is a cross-sectional view cut along the line IIC of FIG. 1.

The embodiments of the present invention will now be described with reference to the drawings. In these drawings, like reference numerals identify like elements.

First Embodiment

Referring to FIG. 1, the optical fiber connector cleaner 1 comprises a long, extended housing 10, cleaning means 20 attached to one end in the longitudinal direction of the housing 10, cleaning tape winding means 32 and cleaning tape delivery means 34 both disposed inside the housing 10, and transmission means 40, the operating part of which protrudes outside the housing 10.

The housing 10 further provides openings 10a, 10b and 10c passing through the outer wall and arranged on the periphery thereof. The housing 10 also includes bearings 11a and 11b positioned corresponding to the cleaning means 20. The housing 10 includes shafts 12a and 12b positioned respectively, corresponding to the winding means 32 and the delivery means 34. The housing 10 houses posts 13a, 13b, 13c and 13d for guiding the cleaning tape T, and a bearing 13e that comprises the center of oscillating rotation of a torsion spring 35 that serves as a link for conveying rotation of the winding means 32 to the delivery means 34. The case 10 has a bracket 14 protruding from the side surface. This bracket 14 includes a stopper wall 15 inclined relative to the side surface.

A cloth of ultra fine fiber such as TORAYSEE (registered trademark) is used for the cleaning tape T. This ultra fine fiber is for example polyester fiber having no fuzz, the standards of which are 0.06 denier with a fiber diameter of approximately 2 μm. The ultra fine fiber penetrates an oil film of 1 to 2 μm and thus can scrap off greasy dirt. Further, the edges of the cleaning tape T are subject to heat cutting processing or ultrasonic cutting processing to prevent occurrence of fuzz.

Figure 4:
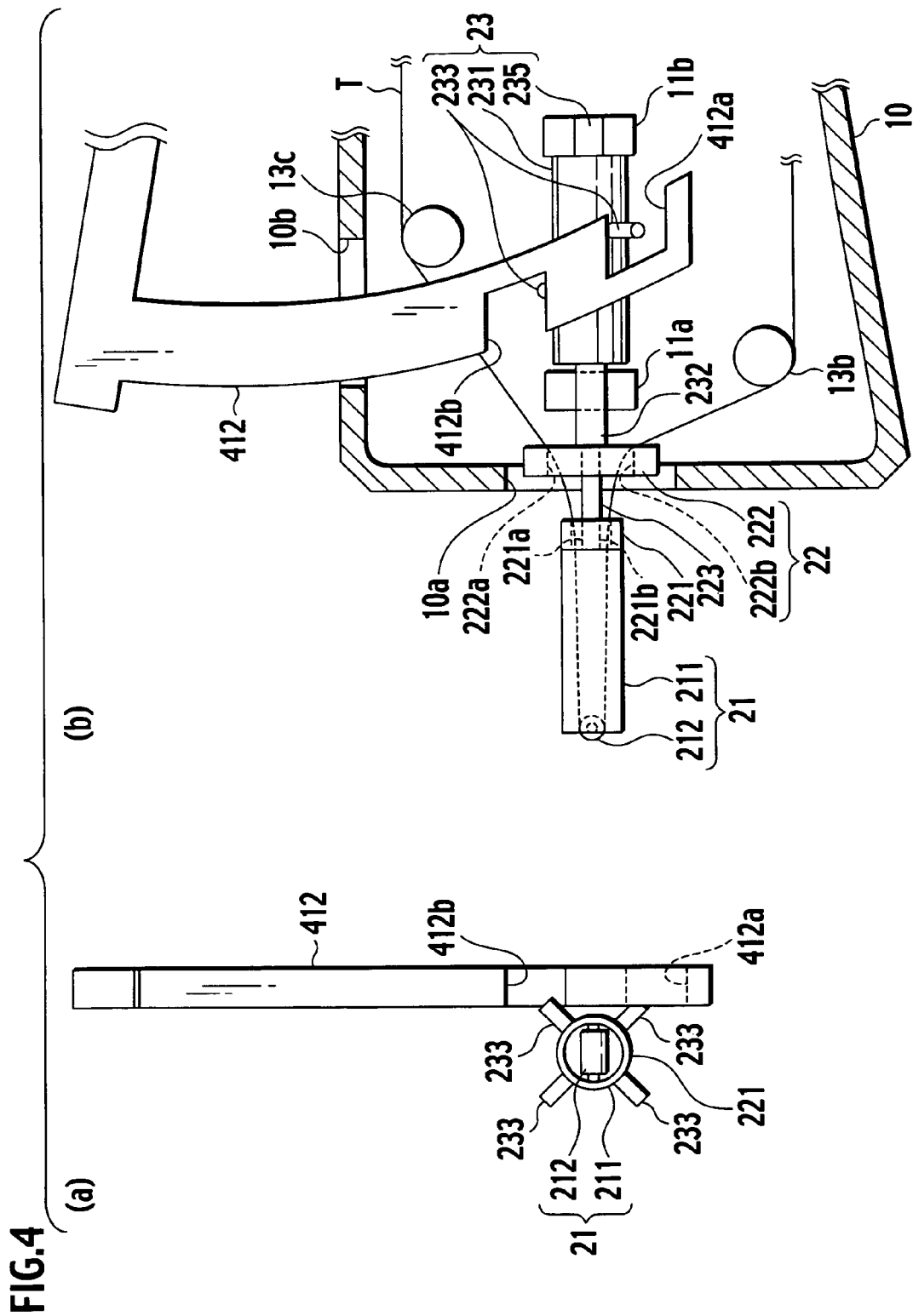
FIGS. 4 (a) and (b) are expanded views of the cleaning part rotating means shown in FIG. 1, the view in FIG. 4 (a) having the guide 22 removed.

Referring to FIG. 4, the cleaning means 20 further provides a cleaning section 21, a guide 22 formed as an integrated body with the cleaning section 21 and a cleaning section rotation means 23 that supports the cleaning section 21 and guide 22 along an axis line.

The cleaning section 21 is of dimensions suitable to allow it to be inserted into an adapter to enable cleaning of the ferrule end surface (connection surface) of an optical fiber connector attached to the adapter.

Referring to FIGS. 5 and 6, the cleaning section 21 has a hollow cylinder (bar-like member) 211 and a cylindrical roller 212 that is exposed at the end part of the cylinder 211. The end of the cylinder 211 has an opening 211a. The roller 212 is rotatably supported by the inner wall of the cylinder 211. A part of the roller 212 protrudes outside from the opening 211a (see FIG. 5). The cleaning tape T is mounted under tension on the roller 212 protruding from the end of the cylinder 211 and wipe off soiling while cleaning.

As shown in FIG. 4, a guide mechanism 22 for the cleaning tape includes a round shaped first guide 221 to which the cylinder 211 is secured, a round shaped second guide 222 distanced along the axial direction from the first guide mechanism 221 and a supporting shaft 223 concentrically connecting the first guide 221 and the second guide 222.

The first guide 221 provides first rectangular openings 221a and 221b formed in a plane symmetry in relation to the supporting shaft 223. The second guide 222 provides second rectangular openings 222a and 222b formed in a plane symmetry in relation to the supporting piece 223.

The shorter side and the longer side of the second guides 222a and 222b are longer than those of the first guides 221a and 221b.

These two types of guide 221 and 222 permit movement of the cleaning tape T inside the openings 221a, 221b, 222a and 222b in the rotational direction. This movement alleviates twisting of the cleaning tape T around the axis caused by the rotation of the cleaning tape T.

The cleaning section rotation means 23 in FIG. 1 comprises a rotation cylinder 231 and rotation shafts 232 and 235 connected at the respective ends of the rotation cylinder 231 in the axial direction thereof. These rotation shafts 232 and 235 are rotatably supported by bearings 11a and 11b respectively. The rotation shaft 232 is integrally connected to the supporting shaft 223 and the rotation cylinder 231. The rotation cylinder 231 further provides a plurality of pins 233 that protrude out from the surface of the rotation cylinder 231. The pins 233 are arranged at an inclination in relation to the axis when an arm 412 described subsequently, presents an arc shape and swings around the rotational center.

The winding means 32 for the cleaning tape T provides a round reel 31 for winding the cleaning tape T and the delivery means 34 provides a round reel 33 for delivering the cleaning tape T. The reels 31 and 33 are rotatably supported around shafts 12a and 12b respectively. The reels 31 and 33 provide respectively a first ratchet 32A and a second ratchet 34A each of which can turn integratedly with their respective corresponding reels 31 and 33. The first ratchet 32A has teeth 321 extending at an inclination in a clockwise direction in relation to the radial direction, while the second ratchet 34A has teeth 341 extending at an inclination in the anticlockwise direction in relation to the radial direction.

The torsion spring 35 that functions as a link mechanism conveying the rotation of winding means 32 to the delivery means 34 is disposed between the winding means 32 and the delivery means 34. This spring 35 is formed by bending processes applied to a tensile material, such as a blade spring, and is pivotably attached so as to swing freely centered on a bearing 13e. The respective ends of the spring 35 engage respectively the teeth 321 of the ratchet 32A of the winding means 32 and the teeth 341 of the ratchet 34A of the deliver means 34.

More specifically, if the ratchet 32A of the winding means 32 swings one end of the torsion spring 35 one pitch in the clockwise direction, the other end of the torsion spring 35 rotates the ratchet 34A of the delivery means 34 one pitch in the anticlockwise direction. Further, the spring 35 prevents reverse rotation of the winding means 32 and the delivery means 34.

The transmission means 40 includes a handle 41 that is gripped by an operator. This handle 41 has a lever 411 having a base and an arm 412 curved in an arc shape extending in the perpendicular direction from the end of the lever 411. The base of the lever 411 is rotatably attached by a pivot 413 to the bracket 14.

The end of the arm 412 has two notches 412a and 412b separated from each other. The notches 412a and 412b each extend transversely from opposite sides of the arm 412. The notches 412a and 412b engage pins 233 of the cleaning section rotation means 23. The cleaning section 21 connected to the cleaning section rotating means 23 rotates due to the engagement of the notches 412a and 412b and the pins 233, thereby applying rotational movement to the cleaning tape T applied to the cleaning section 21. The number of pins 233 and the number of notches on the arm 412 can be freely selected in accordance with the size of the outer diameter of the rotation cylinder 231.

The transmission means 40 includes a torsion spring 43 formed by winding a blade spring material around a post 14a on the bracket 14. One end 43a of this spring 43 engages teeth 321 of the first ratchet 32A. The engagement of this spring 43 and the teeth of the ratchet 32A rotates the winding reel 31 and the delivery reel 33 causing the cleaning tape T to run.

The other end 43b of the spring 43 is biased to the side surface of the case 10. The spring 43 bends at the end part 43c to an approximately right angle. The spring 43 comes into contact with the lever 411 between the post 14a and the end part 43c. The lever 411 biased by the spring 43 stops by contact with the stopper wall 15, and the handle 41 is located in its original position.

The method of operating the cleaner 1 will now be described with reference to FIG. 7.

When cleaning an optical fiber connector attached to an adapter for example, firstly, the cleaning section 21 is inserted inside the adapter and the cleaning tape T on the roller 212 is brought into contact with the ferrule end surface of the optical fiber connector.

Figure 7:
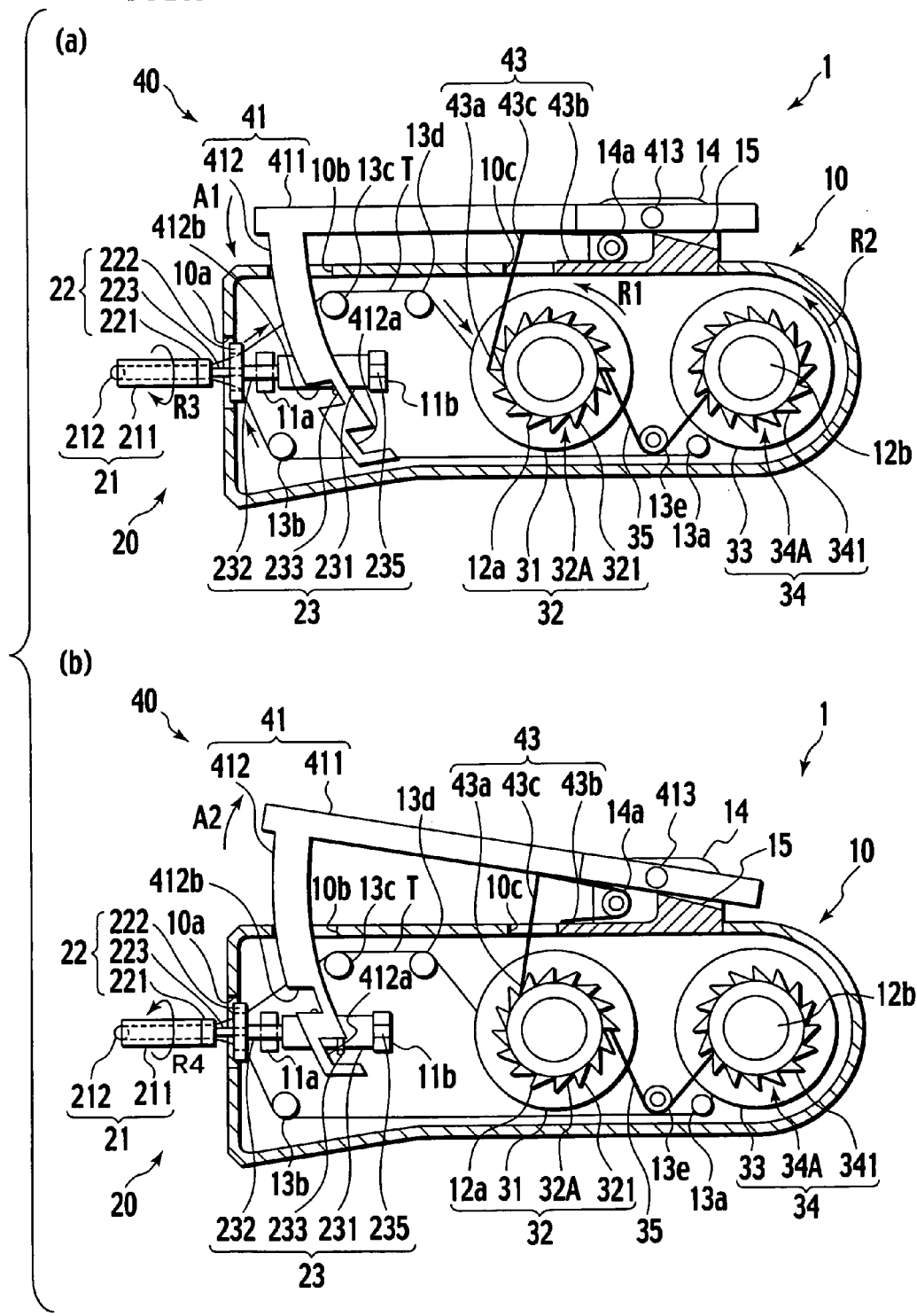
FIG. 7 is a plan view illustrating the operations of the cleaner, FIG. 7 (a) showing operations when a handle is compressed and FIG. 7 (b) showing operations after the handle is released.

Next, as shown in FIG. 7 (a), the handle 41 is lowered in the vertical direction. In response to this, lever 411 rotates around the pivot 413 in anticlockwise direction A1. Due to this rotation the arm 412 of the handle 41 proceeds inside an opening 10b and the torsion spring 43 proceeds inside an opening 10c.

At this time, engagement of the torsion spring 43 with the ratchet 32A of the winding reel 31 causes the winding reel 31 to rotate in the anitclockwise direction R1. Simultaneously, due to this rotation of the winding reel 31, the torsion spring 35 engaging the ratchet 32A of the winding reel 31 and the ratchet 34A of the delivery reel 33 rotates in the clockwise direction, and the delivery reel 33 rotates in the anticlockwise direction R2.

Due to the rotation of the winding reel 31 and the rotation of the delivery reel 33, the cleaning tape T is drawn out from the delivery reel 33 and wound up by the winding reel 31.

More specifically, the cleaning tape T passes along the guide groove 221b of the first tape guide 221 and the guide groove 222b of the second tape guide 222, passing via the posts 13a and 13b, advancing toward the cleaning section 21. Further, the cleaning tape T bends at the roller 212 at the end of the cleaning section 21 and travels via the guidepost 13c and guidepost 13d along the guide groove 222a of the second tape guide 222 and the guide groove 221a of the first tape guide 221 to be wound up by the winding reel 31.

On the other hand, substantially simultaneous with the lowering of the handle 41 as described above, the knock pins 233 of cleaning section rotation means 23 that support the cylinder 211 of the cleaning section 21 engages successively with the upper side of the notches 412a and 412b of the handle 412 thereby rotating the cleaning section 21 at a predetermined angle. This causes the cleaning tape T to clean the ferrule end surface while rotating and running a determined length.

Referring to FIG. 7 (b), the handle 41 is released after cleaning, due to the repulsive force of the torsion spring 43, the knock pin 233 successively engages the lower side of the notches 412a and 412b at the end of the handle 412, reversing to a determined angle and releasing twisting of the cleaning tape T.

When the handle 41 is released the torsion spring 43 applies force in the reverse direction to the winding reel 31 but reversing of the winding reel 31 is prevented by the torsion spring 35. Thus, the end 43a of the torsion spring 43 skips the tooth 321 of the ratchet 32 in the clockwise direction and returns to its original state. The winding reel 31 remains still without reversing and the delivery reel 33 stands still in response to the torsion spring 35. Accordingly, even when the handle 41 is released the cleaning tape T mounted under tension does not become slack.

With the cleaner 1 as described above, the cleaning tape T rotates while advancing forward removing soiling from a connector ferrule end surface. That is to say, the cleaning surface T1 at the end of the cleaning section 21 rotates at the ferrule end surface while being renewed with new cleaning tape, thus the ferrule end surface is constantly rubbed from a variety of directions by fresh clean cleaning tape.

Accordingly, this cleaner 1 provides superior cleaning effects in comparison to a cleaner using a system that cleans only by moving the cleaning tape or a system that cleans only by rotating the cleaning tape.

First Modification

Figure 8:
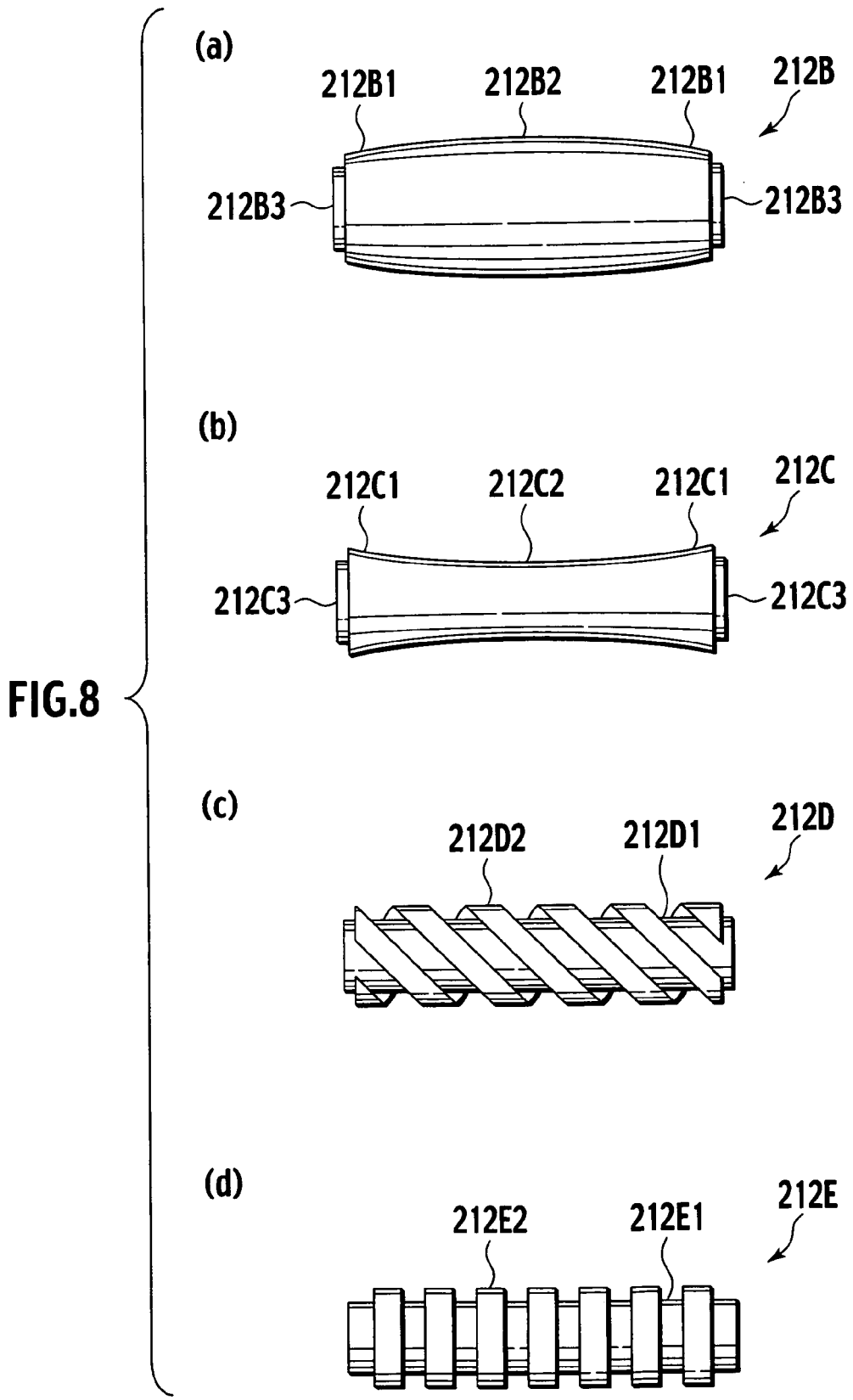
FIGS. 8(a), (b), (c) and (d) are expanded views showing modifications of the cleaner roller of FIG. 1.

FIG. 8 shows another embodiment of the roller 212 mounted at the end of the hollow bar-like member 211 of the cleaning section 21 of the first embodiment.

The barrel shaped roller shown in FIG. 8 (a) can be used for most, ordinary connector ferrule end surfaces. The drum shaped roller shown in FIG. 8 (b) is especially suitable for use for a ferrule end surface of an angled-physical-contact (APC) polished optical connector in a standard connector.

The roller shown in FIG. 8 (c) with whirl shaped belt like protrusions disposed on the roller surface and the roller shown in FIG. 8 (d) with disc shaped protrusions disposed on the roller surface at predetermined intervals are suitable for use when soiling is adhered strongly to the connector surface.

Second Modification

Figure 9:
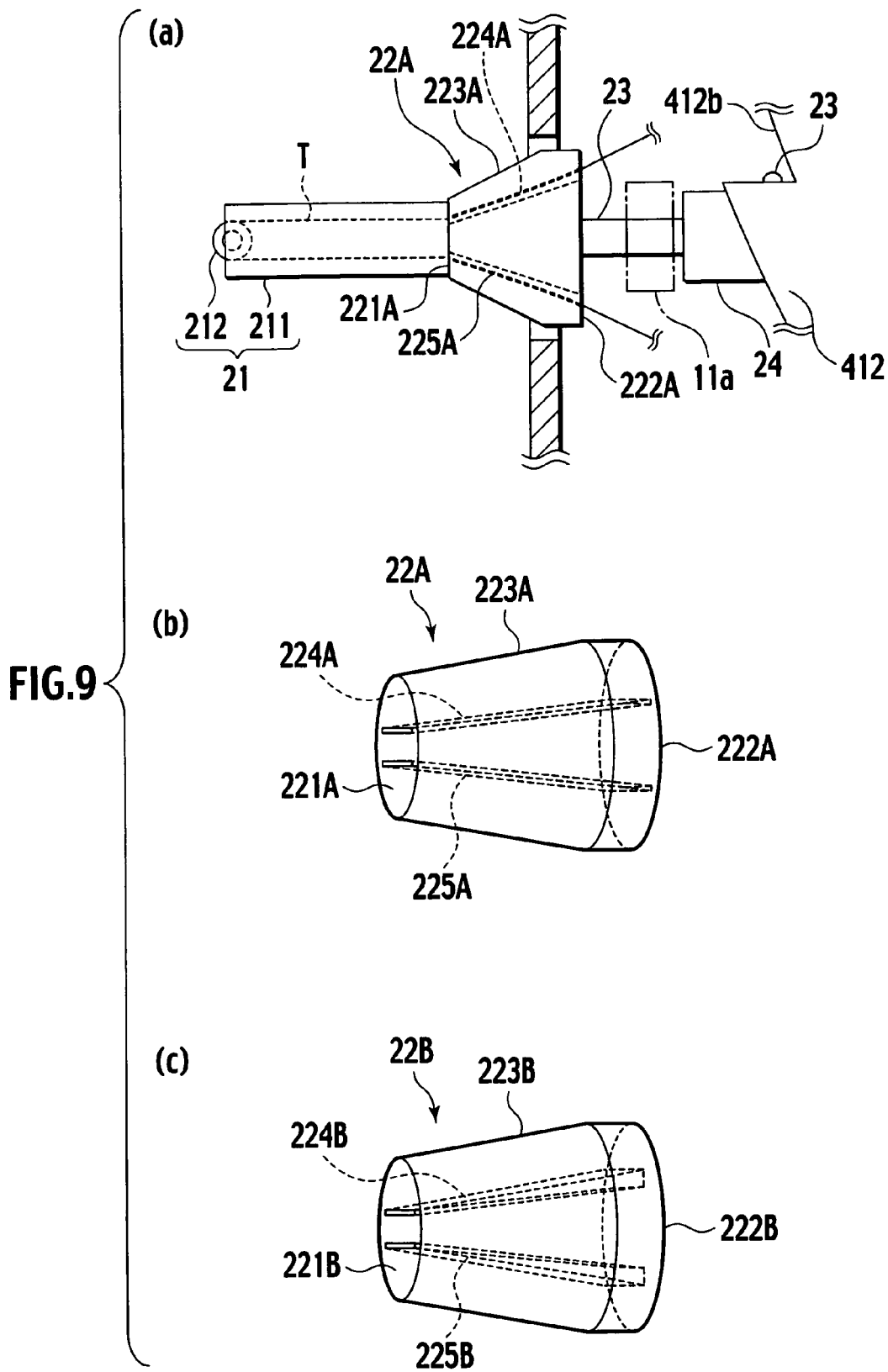
FIG. 9 is an expanded view showing modifications of the cleaner guide shown in FIG. 1, FIG. 9 (a) being a plan view and FIGS. 9 (b) and (c) being perspective views.

FIG. 9 shows another embodiment of the guide 22 of the first embodiment.

FIG. 9 (a) shows a guide member 22A having cone shape with the head cut off, disposed at the rear end of the bar-like member 211 of the cleaning section 21. FIG. 9 (b) is a perspective view of the guide member 22A.

Through holes 224A and 225A having a flat rectangular cross-section for guiding the tape are disposed on the guide member 22A. These guide holes 224A and 225A are disposed at an inclination in relation to the axis of the guide member 22A such that they are positioned mutually separating toward the tape delivery side and the tape winding side, from the rear end of the bar-like member of the cleaning means. Accordingly, even if twisting is applied to the cleaning tape due to the rotation of the cleaning section 21, an increase in friction resistance occurring when the cleaning tape is running can be prevented.

FIG. 9 (c) shows another guide member 22B having a cone shape with cut head.

Through holes 224B and 225B having a flat rectangular cross-section are disposed in the guide member 22B in the same manner as the guide member 22A. These through holes 224B and 225B are disposed at an inclination in relation to the axis of the guide member 22B so as to mutually separate toward the tape delivery side and the tape winding side. The cross-section of the through holes 224B and 225B expands toward the tape delivery side and the tape winding side, thus preventing an increase in running resistance when the cleaning tape twists. Accordingly, it is possible to run the cleaning tape more smoothly.

Third Modification

Figure 10:
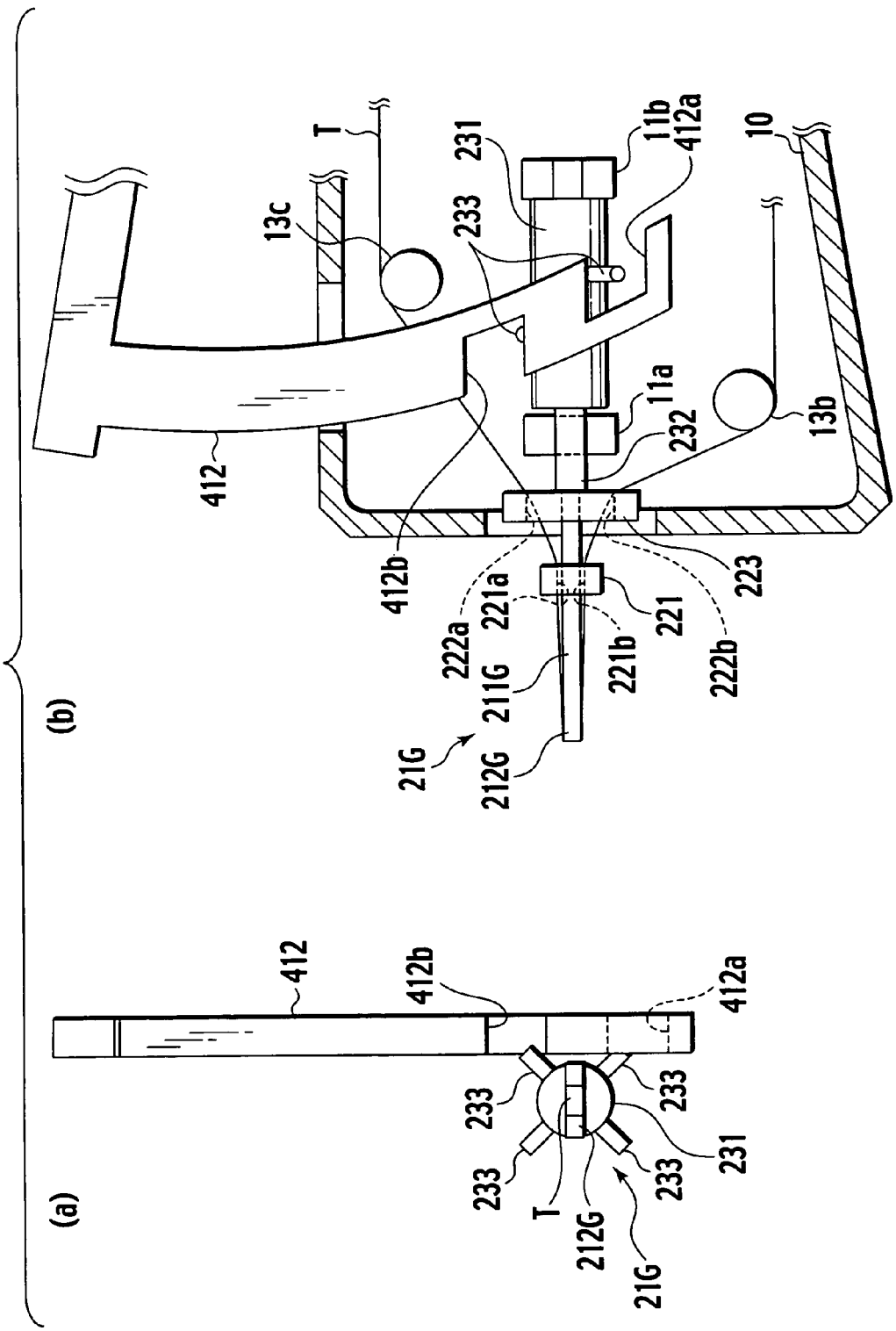
FIG. 10 is an expanded view showing modifications of the cleaning section rotating means and the handle of the cleaner shown in FIG. 1, FIG. 10 (a) being a front view and FIG. 10 (b) being a side view.

Referring to FIG. 10, the cleaning section 21G provides a solid bar-like member 211G extending from a rotation shaft 232 of the cleaning section rotation means 23. The cleaning tape bends around at the end of this bar-like member 211G.

A cleaning tape guide groove (not shown in the drawing) is formed on the side surfaces on each side of the bar-like member 211G, the bar-like member 211G having a substantially H shape on the horizontal cross-section. Thus, when the cleaning tape T moves forward following the side face of the bar-like member 211G, there is no concern that the tape will separate from that side surface.

Fourth Modification

Figure 11:
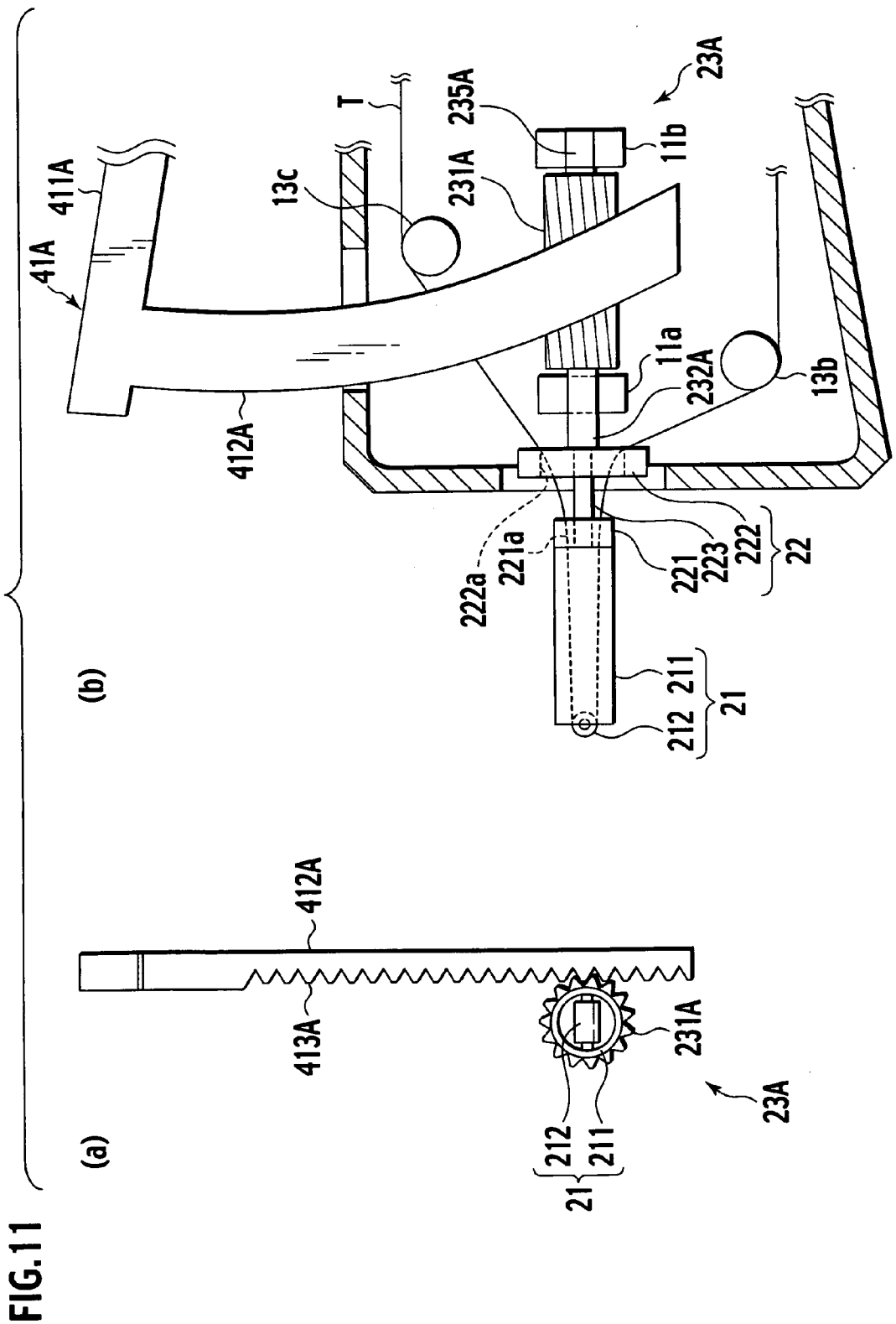
FIG. 11 is an expanded view showing modifications of the cleaning section rotating means and the handle of the cleaner shown in FIG. 1, FIG. 11 (a) being a front view with the guide removed and FIG. 11 (b) being a side view.

Referring to FIG. 11, the handle 41A includes an arm 412A curved in an arc shape and having a rack 413A. The cleaning section rotating means 23A includes a rotation cylinder 231A having a pinion 231A that engages with the rack 413A. When this arm 412A swings centered around the pivoting point 413 (FIG. 1) the rack 231A and pinion 413A form a diagonally tapered state.

Second Embodiment

Figure 12:
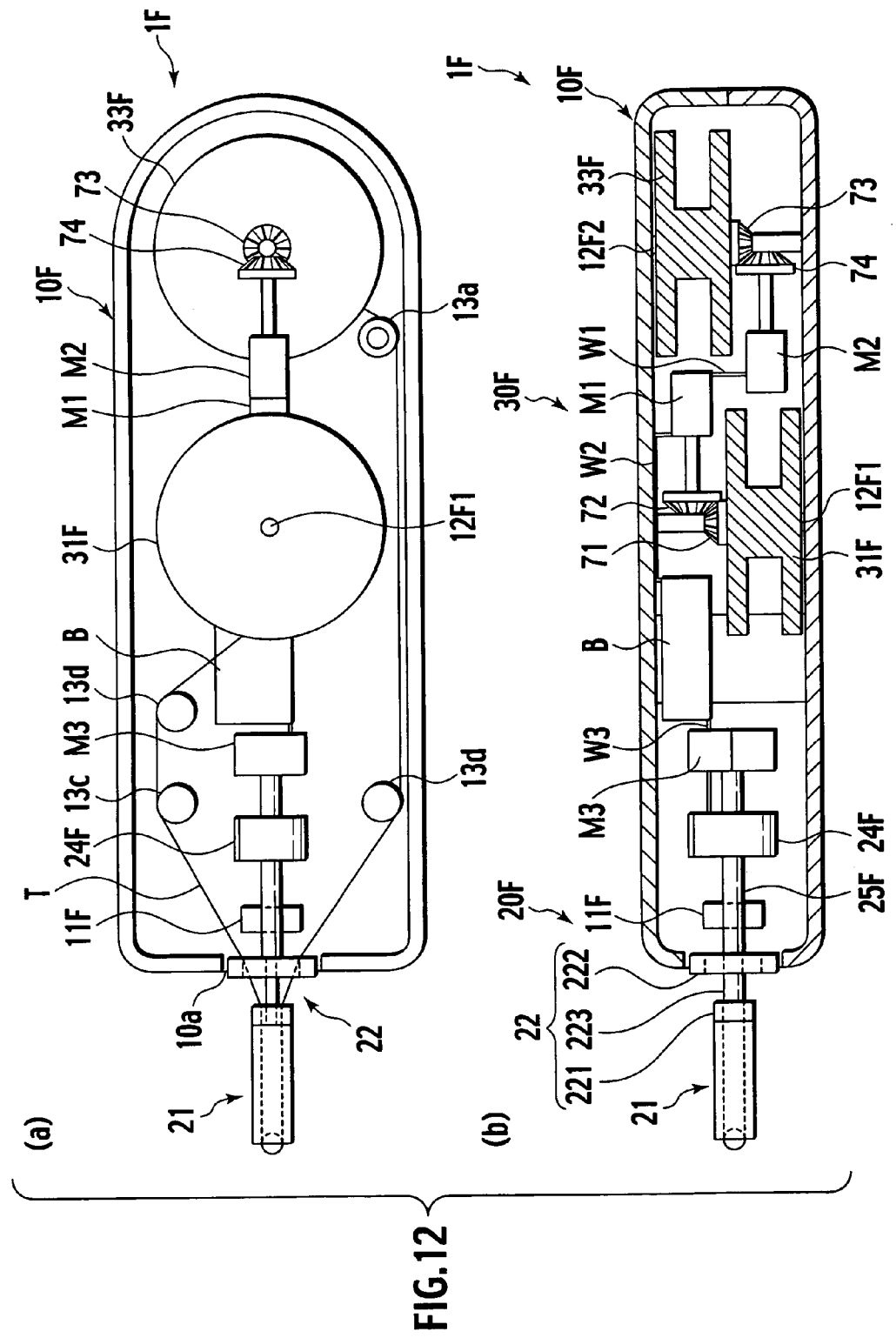
FIG. 12 shows an optical fiber connector cleaner according to a second embodiment of the present invention, FIG. 12 (a) is a partially cutaway plan view and FIG. 12 (b) is a partially cutaway side view.

Referring to FIG. 12, the optical fiber connector cleaner 1F comprises a winding means 31F and delivery means 33F for advancing a cleaning tape T, a cleaning means 20F that rotates the cleaning tape T and their respective actuator mechanisms.

The winding means 31F provides a winding reel rotatably supported by a shaft 12F1 inside a housing. The delivery means 33F includes a delivery reel rotatably supported by a shaft 12F2 inside the housing 10F.

The cleaning tape T is guided by posts 13a, 13b, 13c and 13d.

The cleaning means 20F includes a cleaning section 21 and guide 22 which are secured as a single body at the end thereof, a rotation shaft 25F secured to a supporting piece 223 of the guide 22 and a speed reduction gearbox 24F connected to the rotation shaft 25F.

The actuator includes motors M1 and M2 that drive the winding means 31F and the delivery 33F respectively. The winding means 31F and the motor M1 are mutually connected via a pair of bevel gears 71 and 72. The delivery means 33F and the motor M2 are mutually connected via a pair of bevel gears 73 and 74. The actuator further includes a motor M3 for driving the gearbox 24F. The motors M1, M2 and M3 are electrically connected with a battery B via lead wires W1, W2 and W3.

With this cleaner 1F, the winding means 31F, the delivery means 33F and the cleaning means 20F are driven together by the operation of these motors M1, M2 and M3.

The configuration is such that the cleaning section rotating means 20F (cleaning section 21) reverse after the cleaning tape T advances a predetermined length and the cleaning means 20F (cleaning section 21) rotates by just a predetermined rotational angle. Due to this reverse action, twisting of the cleaning tape T between the winding means 21 and the posts 13b and 13c is released.

Accordingly, the cleaning surface of the cleaning tape T rotates while advancing and soiling on the connecting surface of an optical fiber connector can be removed.

Third Embodiment

Figure 13:
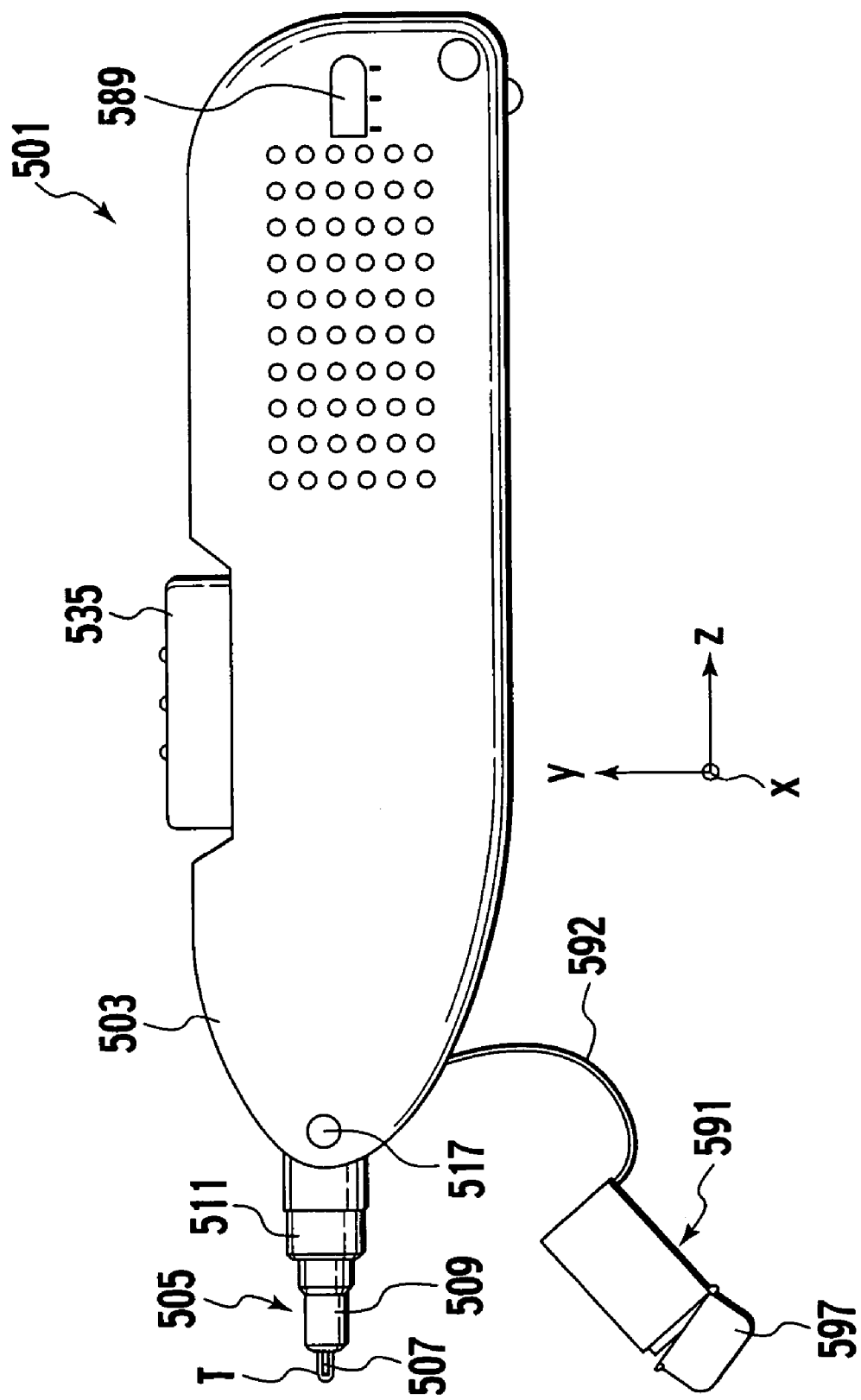
FIG. 13 is a side view showing an optical fiber connector cleaner according to a third embodiment of the present invention.

FIG. 13 shows an optical fiber connector cleaner 501 according to a third embodiment of the present invention. This cleaner 501 comprises a housing 503, a cleaning section 505 disposed at the end of this housing 503 and an operating part 535 movable in the vertical direction, disposed on the upper surface of the housing 503.

The housing 503 is constructed in a longish form extending from front to rear thereof (the leftward-rightward direction in FIG. 13) to enable it to be used while held in one hand and can be disassembled from left to right.

Hereinafter, the longitudinal direction of the housing 503 is referred to as the z direction and the direction of movement of the operating part 535 is referred to as the y direction.

Figure 14:
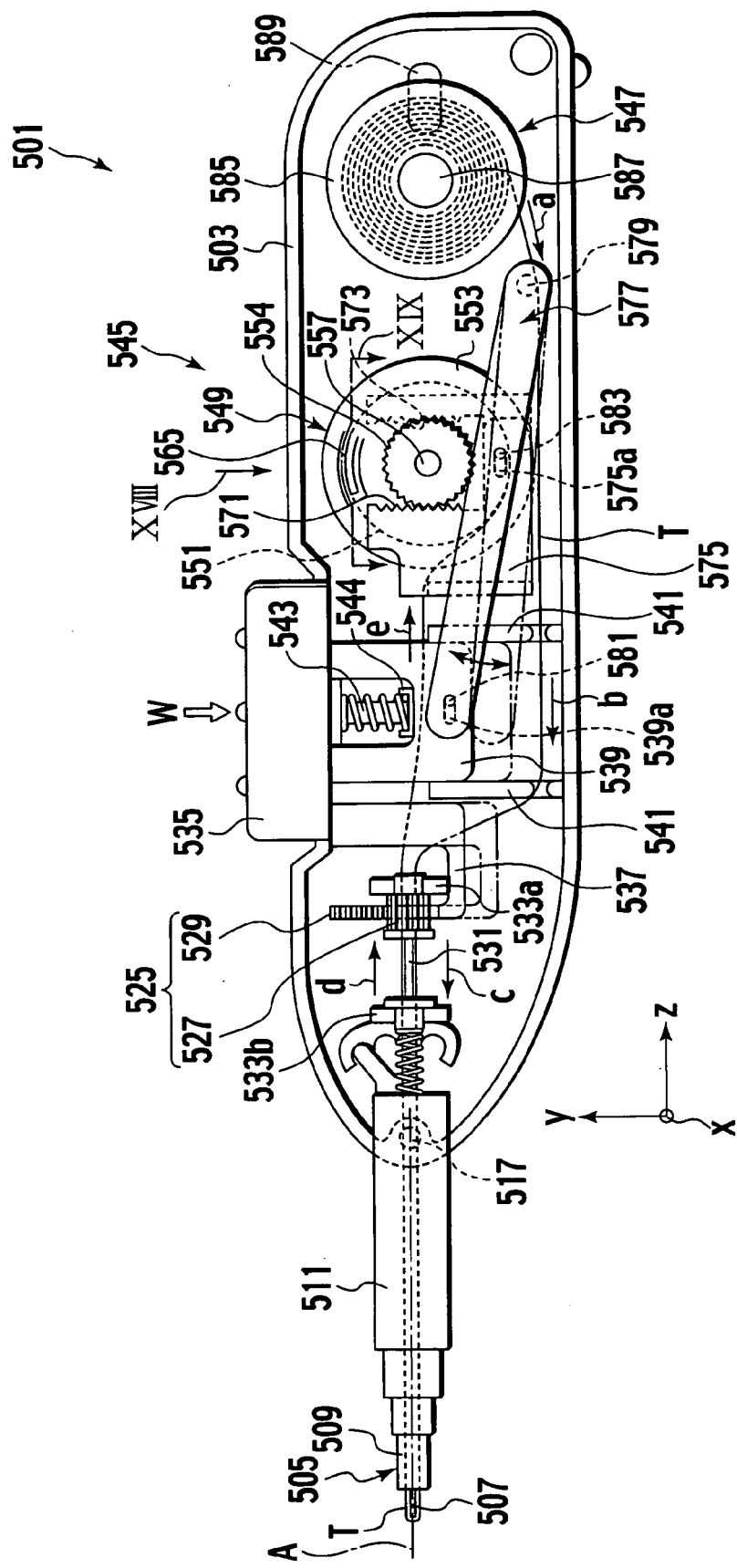
FIG. 14 is a side view showing the cleaner of FIG. 13 with the housing dismantled.

FIG. 14 shows the cleaner 501 in an opened state. The cleaner 501 has, inside the housing 503, a cleaning section rotation means 525 that rotates an inner guide member 507 of the cleaning section 505, a winding means 545 that winds up used cleaning tape T and a delivery means 547 that delivers out cleaning tape T.

Figure 15:
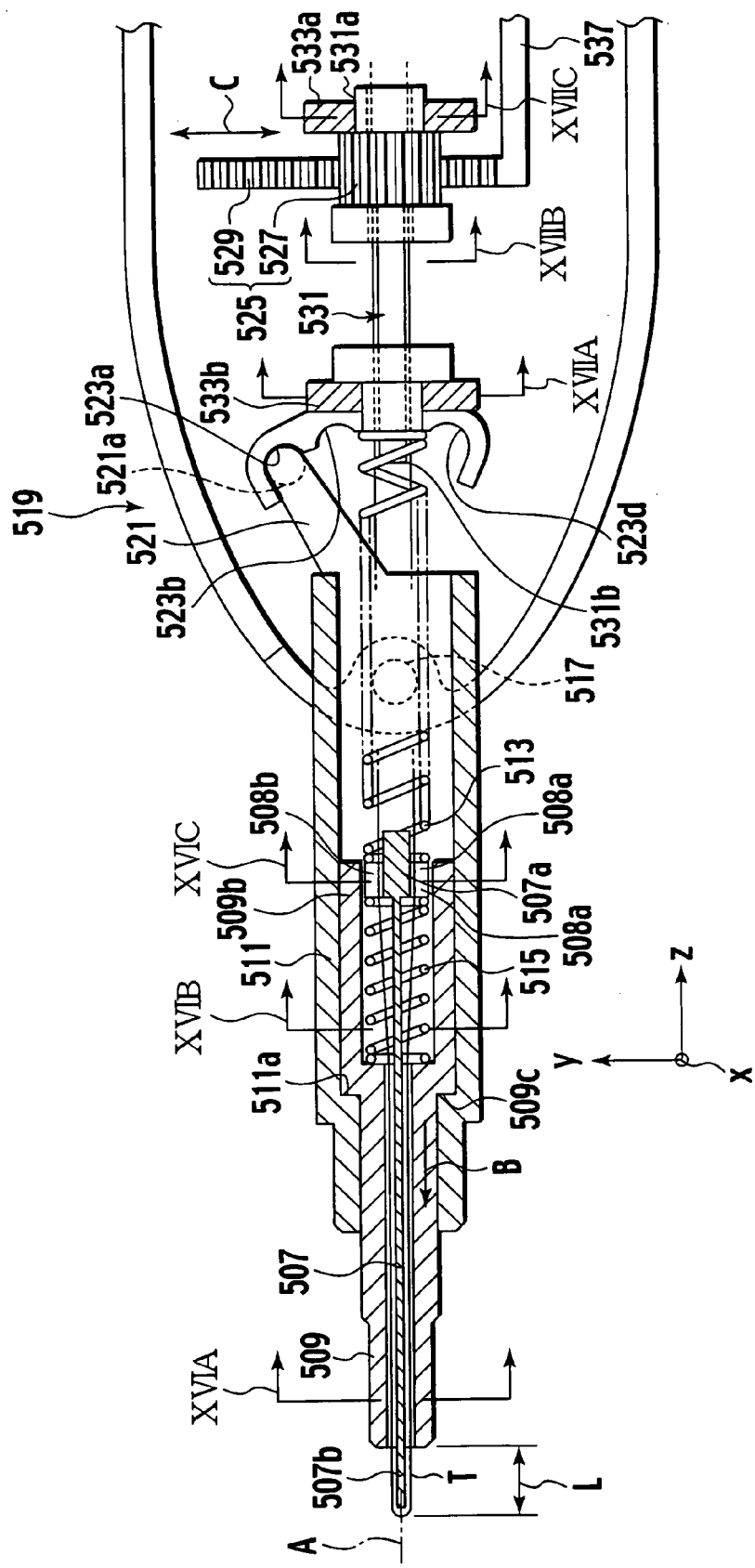
FIG. 15 is an expanded view of the front part of the cleaner of FIG. 14, showing a cross section of the cleaning section.
Figure 16:
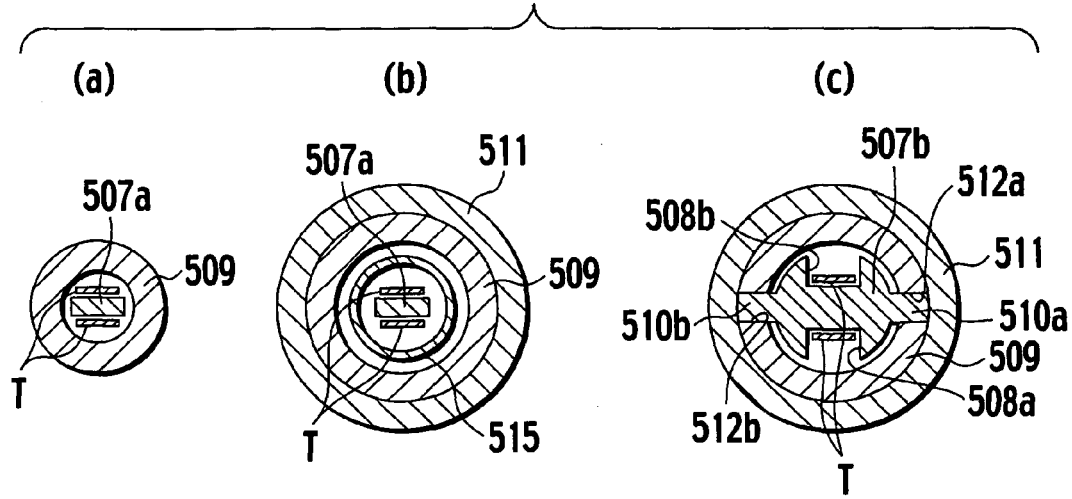
FIGS. 16 (a), (b) and (c) are cross-sectional views cut along the lines XVIA, XVIB and XVIC respectively of FIG. 15.

FIG. 15 is an expanded view of the front part of the cleaner 501, showing the longitudinal section of the cleaning section 505. FIGS. 16 (a), (b) and (c) are transverse sectional views of the cleaning section 505 cut along the lines XVIA, XVIB respectively.

As shown in FIG. 15, the cleaning section 505 includes the inner guide member 507 around which the cleaning tape T runs, a tubular, outer guide member 509 that surrounds the cleaning tape T and the inner guide member 507 and a tubular guide sleeve 511 that surrounds the outer guide member 509.

The inner guide member 507 has a base 507a and an extending part 507b that extends forward from the base 507a (toward the left in FIG. 15) and comprises the tip of the cleaning section 505. As shown in FIGS. 16 (a) and (b), this extending part 507b is formed of a thin plate form, having a narrow width. Thus, even in the case of a connector installed at high density in Distribute Frame, a cleaning operation can be performed easily.

The end surface of the extending part 507b may be formed as a concave circular form matching the ferrule end surface of the optical fiber connector to be cleaned. This provides improved cleaning effectiveness of the cleaner.

As shown in FIG. 15, the cleaning tape T is arranged so as to be capable of movement from the groove 508a of the base 507a, through the lower surface, the end surface and the upper surface of the extending part 507b, to the groove 508b of the base 507a. The cleaning tape T is exposed to the outside only at the end part of the extending part 507b protruding from the external guide member 509.

In this way, as the external guide member 509 covers the inner guide member 507 and the cleaning tape T, the cleaning tape T is protected from soiling and is enabled to run smoothly without becoming removed from the inner guide member 507.

As shown in FIG. 16 (c), engaging parts 510a and 510b that engage the slits 512a and 512b of the outer guide member 509 and extend in the radial direction centered around the z axis, are formed in the base 507a of the outer guide member 507. The slits 512a and 512b are formed long and thin in the z direction. Thus, the rotation of the inner guide member 507 in relation to the outer guide member 509 is restricted in the circular direction centered around the z axis while the inner guide member 507 can slide in the z direction.

As shown in FIG. 15, the inner guide member 507 is biased in the forward direction (direction of the arrow B) by a first spring 513 disposed between the base 507a and the cleaning section rotation means 525 described subsequently. The outer guide member 509 is biased in the forward direction (direction of the arrow B) by a second spring 515 disposed between itself and the inner guide member 507 such that a stepped part 509c formed on the outer guide member 509 engages with a stepped part 511a formed on the guide sleeve 511. The first spring 513 and the second spring 515 are coil springs and the cleaning tape T passes the inner side of these springs.

Figure 23:
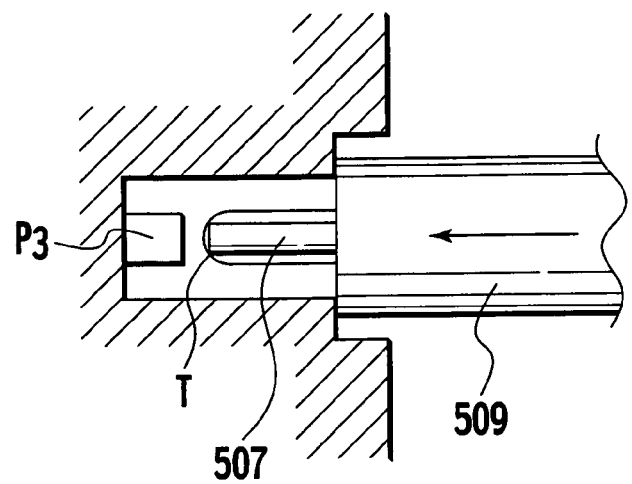
FIG. 23 shows a cleaning operation for a female side terminal positioned substantially inside an opening.

According to the above described configuration, the length L of that part of the inner guide member 507 protruding from the outer guide member 509 can be extended as the outer guide member 509 slides, in opposition to the second spring 515, rearwards in relation to the inner guide member 507. Accordingly, even if for example the terminal P3 is in the innermost part of the opening as shown in FIG. 23, as the outer guide member 509 is pushed on the edge around the opening, making the end of the inner guide member 507 contact with the terminal P3, the terminal P3 can be cleaned. At this time, the end surface of the inner guide member 507 contacts the end surface of the terminal P3 at a predetermined pressure in response to resilience of the first spring 513, thus there is no concern of injury being sustained by the terminal P3.

Referring again to FIG. 15, the guide sleeve 511 is rotatably supported by a rotational axis 517 disposed in the housing 503 at the base.

The guide sleeve 511 is positioned at a predetermined angle in relation to the housing 503 by a positioning means 519. More specifically, the positioning means 519 comprises a plurality of engaging concave parts 523a, b, c and d secured to the housing, and an engaging arm 521 providing an engaging convex part 521a extending from the base of the guide sleeve 511, capable of engaging with the engaging concave parts 523a, b, c and d.

The engaging concave parts 523a, b, c and d are arranged in an arc formation centered around the rotational axis 517, at predetermined angles and with predetermined intervals therebetween. Accordingly, by rotating the guide sleeve 511 about the rotational axis 517 as a supporting point, the engaging convex part 521a can be made to engage with one of the engaging concave parts 523a, b, c or d, thereby positioning the cleaning section 505 at a predetermined angle in relation to the housing 503.

When the engaging convex part 521a is made to engage the engaging concave part 523a which is the upper one in FIG. 15, the cleaning section 505 is positioned parallel to the lengthwise direction z of the housing 503.

Figure 24:
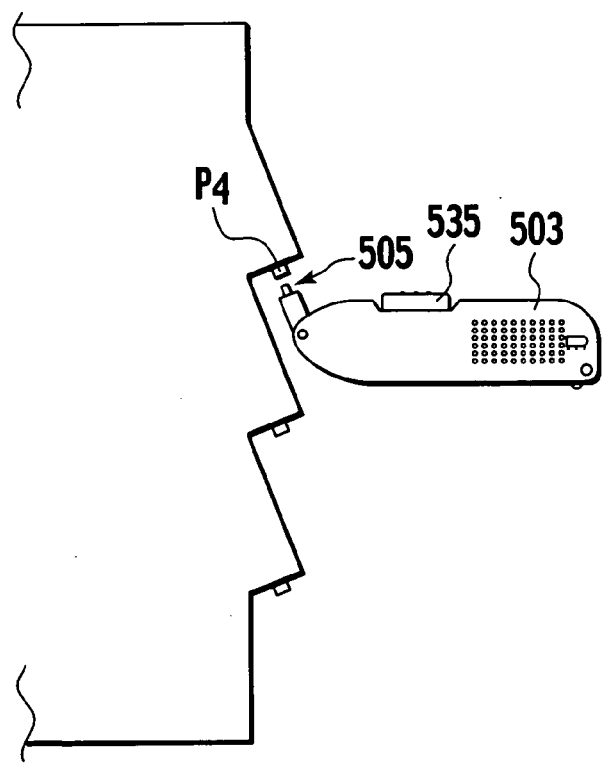
FIG. 24 shows the cleaning operation for a downward facing connector.

On the other hand, when the engaging convex part 521a is made to engage with the engaging concave part 523d which is the lower one in FIG. 15, as shown in FIG. 24, the cleaning section 505 is positioned at an upward inclination in relation to the lengthwise direction z of the housing 503. In this way, by positioning the cleaning section 505 at a predetermined upward angle, the cleaning section 505 can be properly brought into contact with a terminal P4 facing downward in which a laser emitted from a terminal P1 of the connector does not directly enter the eyes of an operator, while at the same time soiling can be easily and definitively removed from the terminal.

Referring again to FIG. 15, the cleaning part rotation means 525 includes a pinion 527 and a rack 529 that engages with the pinion 527.

The shaft 531 of the pinion 527 is supported at both ends thereof so as to rotate about the z axis by bearings 533a and b disposed in the housing 503.

The rack 529 is disposed on an arm 537 extending from the operating part 535 (FIG. 14) and can move in the vertical direction (y direction) together with the operating part 535.

Due to the engagement of the pinion 527 and rack 529, the movement of the rack 529 in the y direction is converted to the rotation of the pinion 527 about the z axis. That is to say, if the operating part 535 is moved upward or downward, the rack 529 moves upwards or downward (the direction of the arrow C) applying forward rotational or reverse rotational force to the pinion 527.

One end of the above-mentioned first spring 513 is secured at the end 531b of the shaft 531 at the cleaning section 505 side. The other end of this first spring 513 is secured to the base 507a of the inner guide member 507. Accordingly, the first spring 513 transmits a rotational driving force from the cleaning section rotation means 525 to the inner guide member 507. That is to say, the first spring 513 provides a function biasing the inner guide member 507 and provides a function transmitting rotational driving force from the cleaning section rotation means 525 to the inner guide member 507. As the cleaning section rotation means 525 is connected via the first spring 513 to the inner guide member 507, even if the cleaning section 505 is positioned at an inclination to the z axis (FIG. 24), rotational driving force can be transmitted to the inner guide member 507 and the inner guide member 507 can be made to rotate about the axis of extension A.

Figure 17:
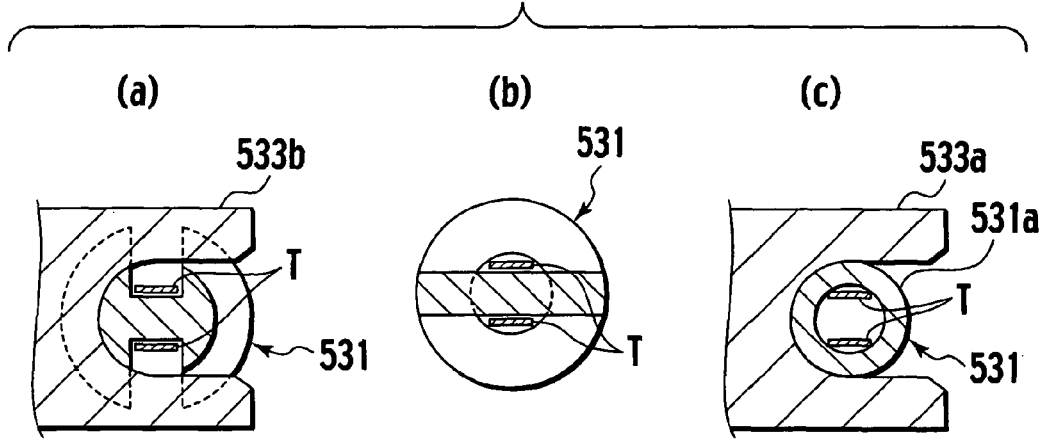
FIGS. 17 (a), (b), and (c) are cross-sectional views cut along the lines XVIIA, XVIIB and XVIIC respectively of FIG. 15.

FIGS. 17(a), (b) and (c) show in cross section, each part of the shaft 531 cut respectively along the lines XVIIA, XVIIB and XVIIC shown in FIG. 15.

The shaft 531 has a groove and opening that guide the cleaning tape T so that it moves along the shaft 531. This prevents contact occurring and intertwining between the unused part and the used part of the cleaning tape T moving in mutually opposite directions along the shaft 531, thereby enabling the cleaning tape T to move smoothly.

Referring again to FIG. 14, the operating means 535 is movably supported by a guide member 541 disposed in the housing 503 such that it can move in the vertical direction (the y direction) only, and is biased in the upward direction by a third spring 543 disposed between itself and a supporting member 544 disposed in the housing 503. Accordingly, the operating part 535 is lowered in response to depression applied in the direction of the arrow W in opposition to the third spring 543 and returns to its original position when raised by the third spring 543 once the depression is released.

The winding means 545 includes a winding reel 549 that winds up used cleaning tape T.

Figure 18:
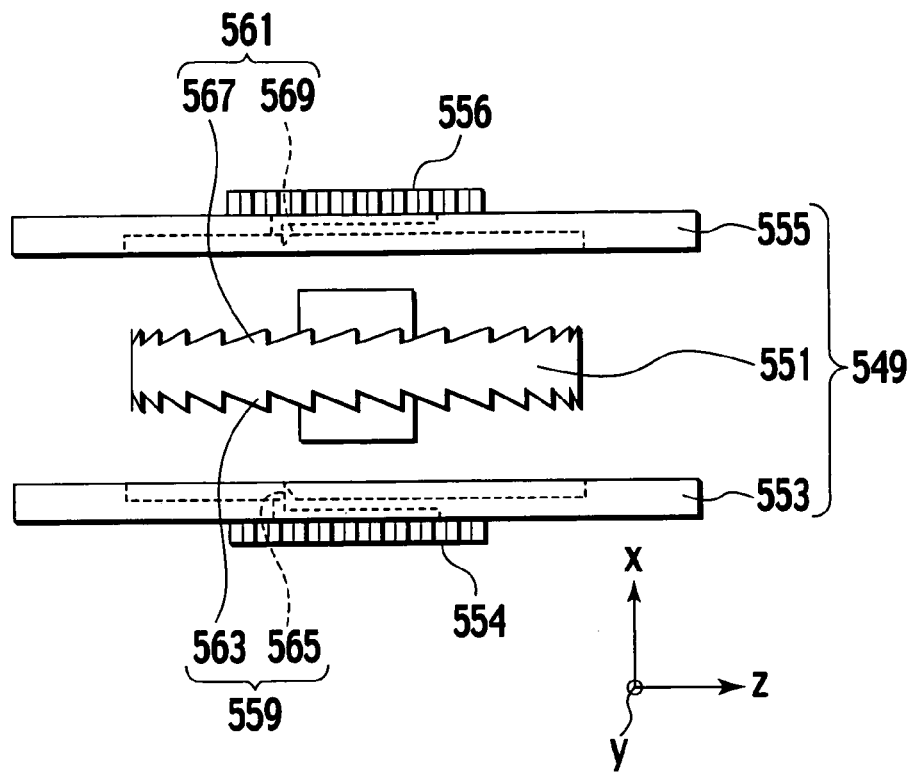
FIG. 18 is an exploded view of the winding reel viewed from the direction of the arrow XVIII of FIG. 14.

FIG. 18 is an exploded view of the winding reel 549 viewed from the direction of the arrow XVIII of FIG. 14.

The winding reel 549 includes a barrel part 551 and a first rotating flange 553 and second rotating flange 555 disposed respectively on either side of the body 551. The barrel part 551 and the first and second rotating flanges 553 and 555 each have a disc shape extending on the yz plane and are rotatably supported by a shaft 557 (FIG. 14) disposed in the housing 503. A first pinion 554 is provided on the external surface (the surface opposite to the side facing the barrel part 551) of the first rotating flange 553 and a second pinion 556 is disposed on the external surface of the second rotating flange 555.

Between the barrel part 551 and the first rotating flange 553a, a first ratchet mechanism 559 is disposed, that transmits to the barrel part 551 rotational movement of the first rotational flange only in the counterclockwise direction in FIG. 14. This first ratchet mechanism 559 includes a plurality of teeth 563 disposed on the side surface of the barrel part 551 facing the first flange 553 and a claw 565 disposed on the first rotating flange 553 that can engage with the teeth 563 and can bend toward the outer side (the side opposite to the barrel part 551).

In the same manner, a second ratchet mechanism 561 that transmits to the barrel part 551 rotational movement of the second rotational flange only in the counterclockwise direction in FIG. 14 is disposed between the barrel part 551 and the second rotating flange 555. This second ratchet mechanism 561 includes a plurality of teeth 567 disposed on the side surface of the barrel part 551 facing the second flange 555 and a claw 569 that can engage with the teeth 567 and can bend toward the outer side (the side opposite to the barrel 551).

Referring again to FIG. 14, the winding means 545 includes a movable frame 575 that rotates the winding reel 549. This movable frame 575 has a first rack 571 that acts as a drive gear that engages with the first pinion 554 and a second rack 573 that acts as a drive gear that engages together with the second pinion 556.

The movable frame 575 is supported so as to slide freely in the vertical direction (y direction) only by a guide rail (not shown in the drawing) disposed in the housing 503.

Figure 19:
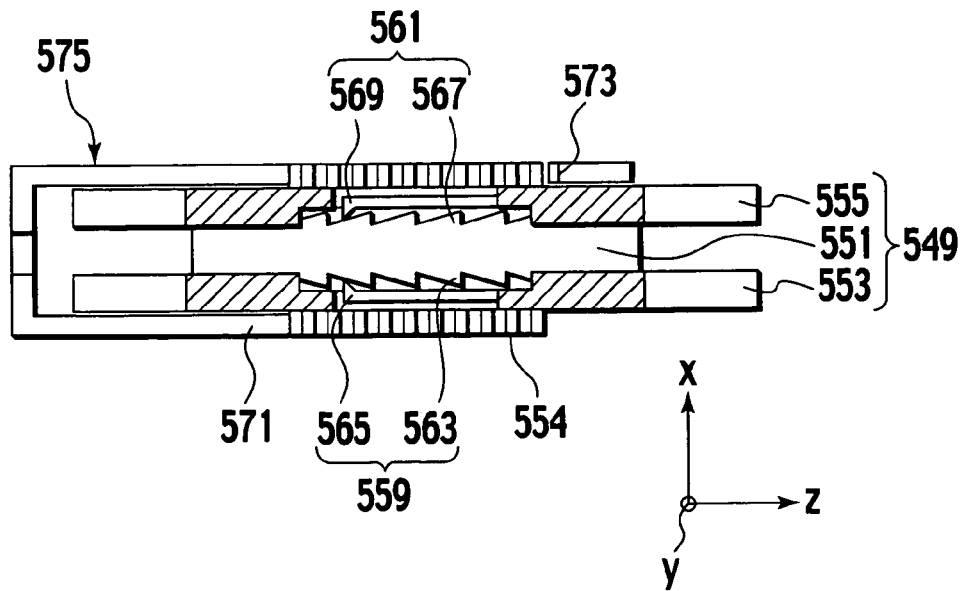
FIG. 19 is a partial cross-sectional view cut along the line XIX-XIX of FIG. 14.

FIG. 19 is a partial cross-sectional view cut along the line XIX-XIX of FIG. 14, and shows the engagement of the first rack 571 with the first pinion 554, and of the second rack 573 with the second pinion 556.

The first rack 571 engages with the teeth at the front (the left-hand side in FIG. 19) of the first pinion 554 while the second rack engages with the teeth at the rear (the right-hand side in FIG. 19) of the second pinion 556. More specifically, as shown in FIG. 14, the first rack 571 and the first pinion 554, and the second rack 573 and the second pinion 556 engage mutually at a position rotated 180° centered around the shaft 557. Accordingly, when the first and second racks 571 and 573 move in the vertical direction (y direction) together with the movable frame 575, the first and second pinions 554 and 556 rotate in mutually opposite directions.

The operations of the winding reel 549, including the operations of the ratchet mechanisms 559 and 561 will now be described with reference to FIG. 19 and FIGS. 20 (a) and (b).

Figure 20:
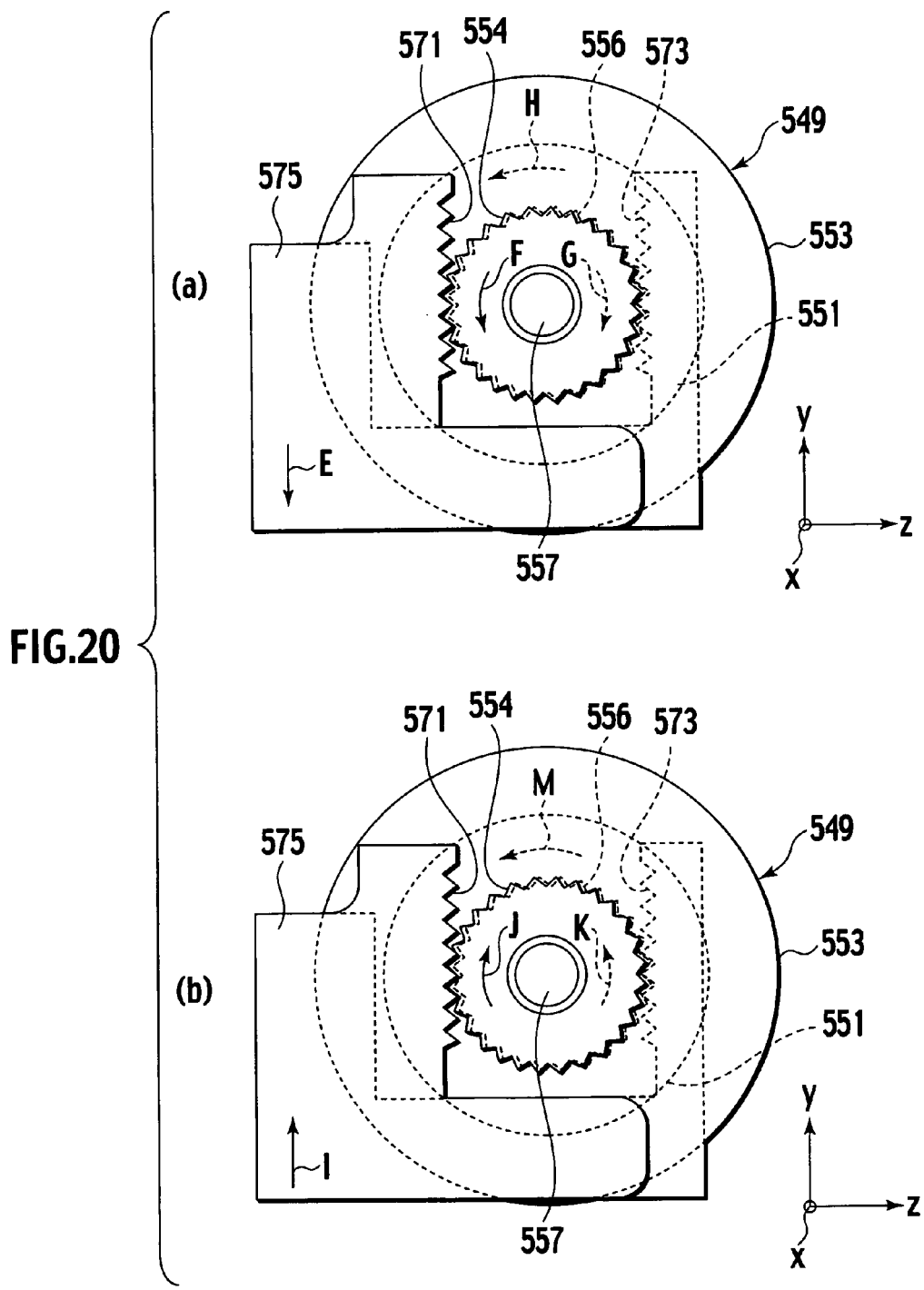
FIGS. 20 (a) and (b) show the operations of the winding reel.

FIG. 20 (a) shows the operations occurring when the movable frame 575 moves downward (the direction of the arrow E).

The first rack 571 rotates the first rotating flange 553 via the first pinion 554 in the counterclockwise direction (the direction of the arrow F), while the second rack 573 rotates the second rotating flange 555 via the second pinion 556 in the clockwise direction (the direction of the arrow G).

The barrel part 551 turns with the rotating flanges 553 and 555 only rotating in the counterclockwise direction, in response to the first and second ratchet mechanisms 559 and 561. Accordingly, the barrel part 551 turns with the first rotating flange 553 and rotates in the counterclockwise direction (the direction of the arrow H). The claw 569 of the second ratchet mechanism 561 bends to the outside thereby riding over the teeth 567, and the second rotating flange 555 idles in the clockwise direction.

FIG. 20 (b) shows the operations occurring when the movable frame 575 moves upward (the direction of arrow I).

The first rack 571 rotates the first rotating flange 553 in the clockwise direction (the direction of arrow J) via the first pinion 554. The second rack 573 rotates the second rotating flange 555 in the counterclockwise direction (the direction of arrow K) via the second pinion 556.

Accordingly, the barrel part 551 turns with the second rotating flange 555 that rotates counterclockwise, and itself rotates counterclockwise (the direction of the arrow M). The claw 565 of the first ratchet mechanism 559 bends to the outside and rides over the teeth 563 and the first rotating flange 553 idles in the clockwise direction.

Accordingly, even when the movable frame 555 moves in either the upward or the downward direction, the barrel part 551 rotates in the counterclockwise direction of FIG. 14, thus causing the cleaning tape T to be wound up.

Referring again to FIG. 14, the winding means 545 further includes a crank rod 577 that operates in connection with the operating part 535 moving the movable frame 575 in the vertical direction.

The crank rod 577 is rotatably supported at one end by a shaft 579 disposed in the housing 503. A pin 581 is provided at the other end of the crank rod 577, this pin engaging with a slot 539a provided in the operating part 535 inside the housing 503. In substantially the middle region of the crank rod 577, a drive pin 583 that engages with a slot 575a provided in the movable frame 575 is provided. The slots 539a and 575a are formed long in the z direction and absorb movement in the z direction of the pin 581 and the drive pin 583 associated with rotation of the crank rod 577.

The operating part 535 is depressed as indicated by the arrow W and lowered in opposition to the resilience of the third spring 543, the pin 581 of the crank rod 577 is pushed down and the crank rod 577 rotates downward about the shaft 579 as a supporting point. The movable frame 575 is pushed down by the drive pin 583 of the crank rod 577 and moves downward.

When the depression is released and the operating part 535 moves upward in response to the resilience of the third spring 543, the pin 581 of the crank rod 577 is pushed up and the crank rod 577 rotates upward about the shaft 579 as a supporting point. The movable frame 575 is pushed up by the drive pin 583 of the crank rod 577 and moves upward.

Due to the winding means 545, when the operating part 535 is depressed, the movable frame 575 moves downward and the barrel part 551 of the winding reel 549 rotates counterclockwise together with the first rotating flange 553. Once the depression of the operating part 535 is released, the movable frame 575 moves upward and the barrel part 551 of the winding reel 549 rotates in the counterclockwise direction in FIG. 14 together with the second rotating flange 555.

Accordingly, the cleaning tape T is wound by a predetermined amount to the winding reel 549 when the operating part 535 is depressed or the depression is released.

The delivery means 547 includes a reel 585 on which is wound the unused portion of the cleaning tape T. This reel 585 is rotatably supported by a shaft 587 provided in the housing 503.

The reel 585 is subject to an appropriate degree of resistance when rotating, for example by a protrusion (not shown in drawing) disposed on the peripheral surface of the shaft 587 or a spring (not shown in the drawing) passing through the shaft 587 and disposed between the reel 585 the housing 503. Accordingly, the cleaning tape T is prevented from being delivered from the reel 585 more than necessary to be slack at the end 507b of the cleaning section 505.

The cleaning tape T is wound on to the winding reel 549 and moves from the reel 585 following the path of the arrows a, b, c, d and e in FIG. 14 such that an unused part of the cleaning tape T is constantly supplied to the end of the cleaning section 505.

The used and remaining quantity of the cleaning tape T can be checked from outside via a viewing window 589 disposed in the housing 503.

The cleaner 501 configured as described above operates such that when the operating part 535 is depressed used cleaning tape T is wound up by the winding means 545 and fresh cleaning tape T is delivered from the delivery means 547. Accordingly, soiling can be removed consistently from a terminal surface using fresh cleaning tape T.

A cover 591 as shown in FIG. 13 can be detachably mounted on the cleaning section 505. This cover should be joined to the housing 503 by a band 592 to ensure that it is not lost when detached.

Figure 21:
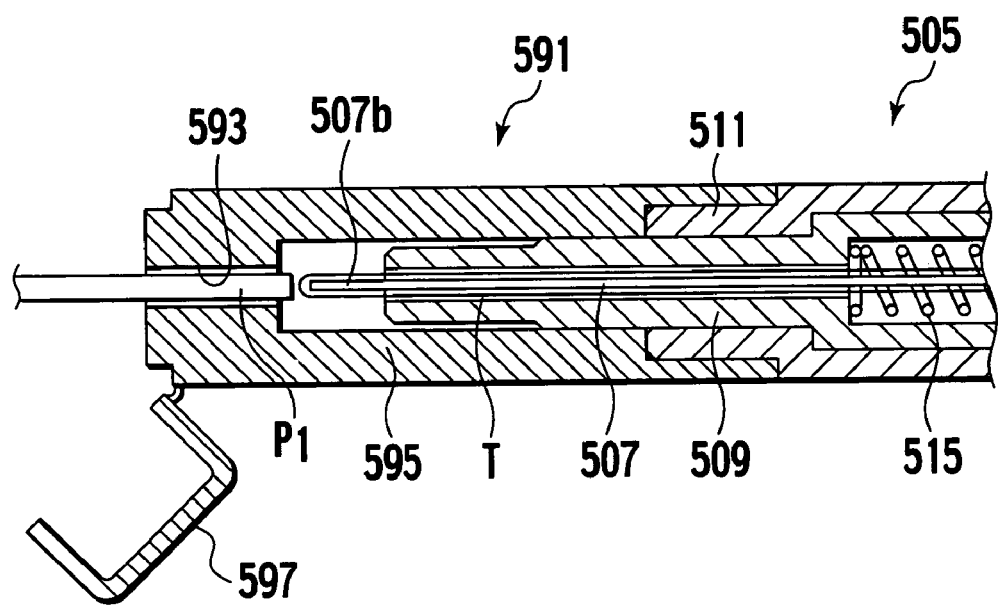
FIG. 21 shows the cleaning section with cover mounted.

FIG. 21 shows the end of the cleaning section 505 with cover 591 mounted.

The cover 591 includes a tubular part 595 and a cap 597 that can be detachably attached to the end of the tubular part 595. The tubular part 595 has an insertion hole 593 in the end thereof, this insertion hole 593 being adapted to accommodate insertion therein of the male side terminal P1 where the connection end surface of the connector is not enclosed by the adapter. The insertion hole 593 can be covered by the cap 597.

When the cleaner 501 is not being used, the tubular part 595 of the cover 591 is mounted on the cleaning section 505 and the cap 597 is applied to the end of the tubular part 595 thereby protecting the end 507*b* of the cleaning section 505 from soiling.

When the cleaner 501 is used to clean the male side terminal P1, the cover 591 is mounted on the cleaning section 505 with the cap 597 removed from the tubular part 595, the male side terminal P1 is inserted in the insertion hole 593. In this way, the terminal surface of the male side terminal P1 is brought into contact with the cleaning tape T of the end 507*b* of the cleaning section 505 and soiling can be removed therefrom.

Fifth Modification

Figure 22:
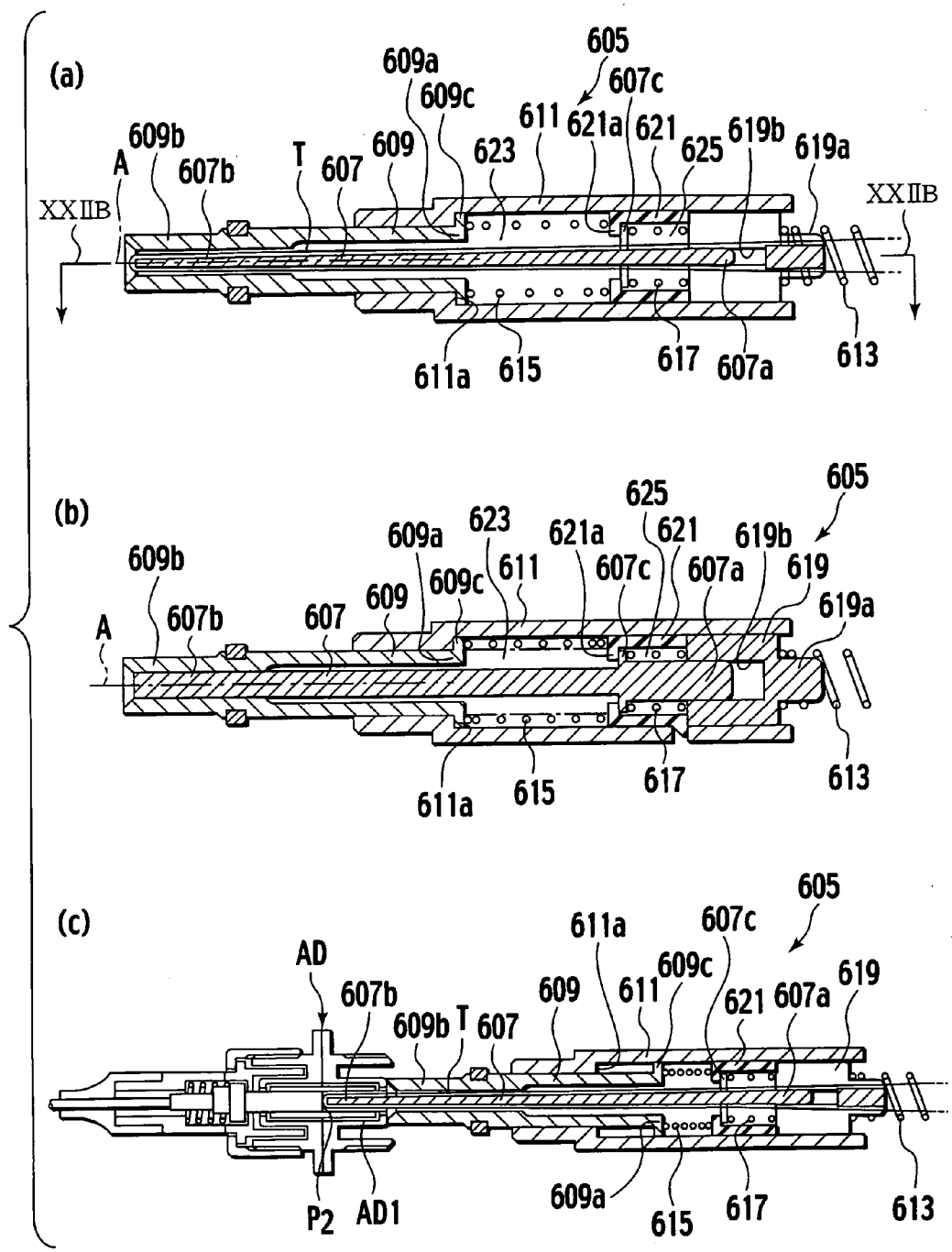
FIGS. 22 (a), (b) and (c) show the fifth modification of the cleaning section of the cleaner shown in FIG. 13.

FIGS. 22 (*a*) and (*b*) show the fifth modification of the cleaning section 605.

Referring to FIG. 22 (*a*), the cleaning section 605 differs from the cleaning section 505 of the third embodiment in that the spring 613 for transmitting rotational driving force from the cleaning section rotation means (not shown in the drawing) to the inner guide member 607 and the spring 617 for biasing the inner guide member 607 in the forward direction are provided separately and in that the end 607*b* of the inner guide member 607 is arranged in the inner side of the external guide member 609.

The cleaning section 605 provides an inner guide member 607 along which the cleaning tape T runs, a tube shaped external guide member 609 that encompasses the front part (the left side in FIG. 22 (*a*)) of the inner guide member 607 in the cleaning tape T, and a tube shaped guide sleeve 611 that encompasses the rearward part of the external guide member 609, and the cleaning tape T and inner guide member 607.

As shown in those drawings, the end 607*b* of the inner guide member 607 is normally positioned in the inner side of the external guide member 609, thus cleaning tape T at the end 607*b* is protected from soiling before being used.

A rotary joint 619 is rotatably supported about the axis of extension A of the inner guide member 607 at the base inside a guide sleeve 611. One end of a first spring 613 is secured to the base 619*a* of the rotary joint 619 while the other end of the spring is secured to the cleaning section rotation means. An engaging part 619*b* that engages the external periphery of the base 607*a* of the inner guide member 607 is disposed at the front side of the rotary joint 619.

The inner guide member 607 can slide along the direction of the axis of extension A in relation to the rotary joint 619. Further, the inner guide member 607 engages with the rotary joint 619 such that the guide member 607 is prevented from moving in a circumferential direction in relation to the axis of extension A. Accordingly, the rotary joint 619 is rotated in response to rotational driving force transmitted from the first spring 613 and rotates the inner guide member 607.

A stopper 621 is secured at the middle part inside the guide sleeve 611. The stopper 621 further has an annular part 621*a* that extends in a plane perpendicular to the axis of extension A. This annular part 621*a* defines two spring accommodating openings 623 and 625 inside the guide sleeve.

A flange 609*c* formed in the base 609*a* of the external guide member 609 is arranged in the first spring accommodating opening 623 that is positioned forward. The external guide member 609 is biased in the forward direction along the axis of extension A by a second spring 615 disposed between the flange 609*c* and the stopper 621 such that this flange 609*c* engages with a stepped part 611*a* formed at the end of the guide sleeve 611. By depressing the external guide member 609 in opposition to the second spring 615, the external guide member 609 slides rearward in relation to the guide sleeve 611.

A flange 607*c* formed between the base 607*a* and the extending part 607*b* of the inner guide member 607 is arranged in the second spring accommodating opening 625 that is positioned rearward. The inner guide member 607 is biased in the forward direction along the axis of extension A by a third spring 617 disposed between the flange 607*c* and the rotary joint 609 such that this flange 607*c* engages with the stopper 621. The inner guide member 607 can be maintained applying a constant pressing force in relation to the connecting surface to be cleaned by the resilience of this third spring 617.

When a single spring performs a biasing function and a function transmitting rotational drive force, it may occur that the pressing force of the end of the inner guide member increases more than necessary due to the increased spring constant, so that the cleaning tape T does not run smoothly. However, as described above, by providing a rotational driving force transmitting spring 613 and forward direction biasing spring 617 separately and making the spring constant of the biasing spring smaller than the spring constant of the rotational driving force transmitting spring, the cleaning tape T can be made to run smoothly.

FIG. 22 (*c*) shows the cleaning section 605 when cleaning an optical fiber connector end surface P2 mounted in an adapter AD. As shown in that drawing, as the external guide member 609 slides rearward in relation to the guide sleeve 611 while the end 607*b* of the inner guide member 607 is inserted in the split sleeve AD1 of the adapter AD.

More specifically, the cleaning section 605 is positioned such that the end 609*b* of the external guide member 609 is in contact with the end of the split sleeve AD1 of the adapter AD, the cleaning section 605 being moved toward the end surface P2. The external guide member 609 [is pushed back [by]], the split sleeve AD1, compressing the second spring 615. The inner guide member 607 and the guide sleeve 611 move forward in relation to the external guide member 609. Thus, the end 607*b* of the inner guide member 607 protrudes from the external guide member 609 and the cleaning tape T of the end 607b comes into contact with the connector end surface P2.

After the end surface P2 is cleaned in the same manner as the third embodiment, if the cleaning section 605 is pulled away from the adapter AD, the external guide member 609 is biased by the second spring 615 to return to the position shown in FIG. 22 (a), and the end 607b of the inner guide member 607 is once again accommodated internally in the external guide member 609.

In this way, as the end 607b of the inner guide member 607 is positioned internally in the external guide member 609, the cleaning tape T is protected from soiling before being used and when being used for cleaning the cleaning tape T is protected from soiling due to coming into contact with parts other than the connector ferrule end surface.

As is clear from the above description, the optical fiber connector cleaner and the method for cleaning an optical fiber connector ferrule end surface according to the embodiments of the present invention have the following characteristics.

(1) The optical fiber connector cleaner 1 comprises:
a housing 10;
a cleaning tape T winding means 32 and cleaning tape delivery means 34 arranged inside the housing;
a cleaning means 20 having a bar-like cleaning section 21 projecting outwardly from the housing, on the front-end of the cleaning section the cleaning tape delivered from the delivery means being movably mounted under tension in an exposed state, the front-end of the cleaning section being brought into contact with the end surface of an optical fiber connector to thereby clean the end surface;
a cleaning section rotating means 23 coaxially connected to the cleaning section in the housing and rotatably supported with respect to the housing; and
a transmission means 40 which rotates the winding means and the cleaning section rotating means substantially simultaneously in a predetermined direction through a predetermined angle and then reverses the cleaning section rotating means to its original position.

(2) The optical fiber connector cleaner 1 comprises:
a housing 10;
a cleaning tape winding means 32 and cleaning tape delivery means 34 arranged inside the housing;
a cleaning means 20 having a bar-like cleaning section 21 projecting outwardly from the housing, on the front-end of the cleaning section the cleaning tape delivered from the delivery means being movably mounted under tension in an exposed state, the front-end of the cleaning section being brought into contact with the end surface of an optical fiber connector to thereby clean the end surface;
a cleaning section rotating means 23 coaxially connected to the cleaning section in the housing and rotatably supported in relation to the housing;
a cleaning tape guide means 22 coaxially connected to the cleaning section and rotatably supported in relation to the housing; and
a transmission means 40 which rotates the winding means and the cleaning section rotating means substantially simultaneously in the respective predetermined directions through the respective predetermined angles and then reverses the cleaning section rotating means to its original position.

(3) The transmission means 40 rotates the winding means 32, the delivery means 34 and the cleaning tape rotating means 23 substantially simultaneously.

(4) The cleaning section 21 includes a hollow bar-like member 211 and a smooth member 212 arranged at the end of the bar-like member.

(5) The cleaning section 21 includes a hollow bar-like member 211 and a roller rotatably mounted at the end of that bar-like member.

(6) The main part of the cleaning section 21 is a solid bar-like member.

(7) The cleaning tape T is cloth that has been subject to a fuzz prevention process.

(8) The cleaning tape T is a woven cloth that has been subject to a fuzz prevention process.

(9) The transmission means 40 includes an arm 412 that rises and lowers in vertical direction, and the transmission means is configured such that due to the downward movement of the arm the winding means 32 is rotated to a first angle in a first direction while simultaneously the cleaning section rotating means 23 is rotated to a second angle in a second direction, moreover due to the upward movement of the arm the cleaning part rotating means is rotated to the second angle in the opposite direction to the second direction.

(10) The transmission means 40 includes an arm 412 that rises and lowers in vertical direction, and the transmission means is configured such that due to the downward movement of the arm the winding means 32 is rotated to a first angle in a first direction while the cleaning section rotating means 23 is rotated to a second angle in a second direction and simultaneously therewith, the delivery means 34 is rotated to the first angle in a third direction, moreover due to the upward movement of the arm the cleaning part rotating means is rotated to the second angle in the opposite direction to the second direction.

(11) The arm 412 of the transmission means 40 has a plurality of notches 412a and 412b formed along the longitudinal direction thereof, the cleaning section rotating means 23 has a plurality of protrusions 233 disposed on the external peripheral surface thereof, and when the arm descends the protrusions of the cleaning section rotating means are pushed down in succession by the notches on the arm and the cleaning part rotating means rotates at a determined angle in a determined direction, while when the arm ascends the protrusions of the cleaning section rotating means are pushed up in succession by the notches on the arm and the cleaning section rotating means rotates at a determined angle opposite to that determined direction.

(12) The arm 412 of the transmission means 40 includes a rack having a plurality of notched grooves 413a, the cleaning part rotating means 23a includes a pinion having a plurality of teeth 231a that engage with the rack, and the cleaning section rotating means rotates in a determined direction or in a direction opposite thereto in response to the ascent or decent of the arm.

(13) The method for cleaning the end surface of a ferrule of an optical fiber connector comprises the steps of:
bringing the surface of a cleaning tape into contact with the end surface of a ferrule of an optical fiber connector;
moving the cleaning tape a uniform distance only, in the longitudinal direction thereof; and
rotating the cleaning tape over the connecting surface of the optical fiber connector while the cleaning tape is moving.

(14) The method for cleaning the end surface of a ferrule of an optical fiber connector comprises the steps of:
inserting into an optical fiber connector, the end of a cleaning section on which a cleaning tape is movably mounted under tension;
bringing the cleaning tape at the end of the cleaning section into contact with the end surface of a ferrule of the optical fiber connector; and rotating as well as moving the cleaning tape while the cleaning tape is brought into contact with the end surface of the ferrule.

(15) The optical fiber connector cleaner 501 comprises:

a housing 503 of a size that can be held in one hand;

a bar-like cleaning section 505 disposed at the end of the housing and having an axis of extension;

a winding means 545 and a delivery means 547 arranged inside the housing;

a cleaning tape T that is wound up by the winding means after being delivered from the delivery means and being wound around the end of the cleaning section;

a cleaning section rotating means 525 that rotates the cleaning section a determined amount about the axis of extension; and a manual operating part 535 that drives the cleaning section rotating means simultaneously with driving the winding means 545, wherein the cleaning section includes a bar-like inner guide member 507 around the side surfaces and end section of which the cleaning tape is arranged, and an outer side guide member 509 that encompasses the inner guide member and the outside of the cleaning tape with the end of the inner guide member exposed, the inner guide member and the outer guide member are biased to the direction of the end of the housing, independent of each other.

(16) The cleaning section 505 is supported at the base by a shaft 517 disposed in the housing, and can rotate about the shaft at a determined angle in relation to the housing.

(17) The optical fiber connector cleaner has a cover 591 that can be attached to and removed from the cleaning section 505, the cover includes a tubular part 595 having an insertion hole 593 that can accommodate the insertion of a terminal of the male side of a connector.

(18) The cover 591 includes a cap 597 that covers the insertion hole 593.

(19) The optical fiber connector cleaner 501 comprises:

a housing 503;

a cleaning section 505 or 605 disposed at one end of the housing, said cleaning section including a bar-like member 507 rotatably supported in the housing about the axis of extension A of the bar-like member, the cleaning tape being supported at the end of the bar-like member in an exposed state so as to be capable of movement in the lengthwise direction of a cleaning tape;

a movable operating part 535 disposed in the housing;

a cleaning section rotation drive means 525 that is connected to the bar-like member and the operating part and rotates the bar-like member about the axis of extension in response to movement of the operating part; and a winding means 545 that is connected to the operating part, that winds the cleaning tape in response to movement of the operating part and that advances the cleaning tape at the end of the bar-like member.

(20) The cleaning section rotating drive means 525 rotates the bar-like member 507 or 607 in the forward direction of the rotation of the axis of extension A in response to a first movement of the operating part 535 and rotates the bar-like member in the backward direction returning the bar-like member to their original position in response to a second movement of the operating part, wherein the winding means 545 has a winding part 551 rotatably supported in the housing 503 that winds the cleaning tape, this winding part rotating in a predetermined direction to wind the cleaning tape in response to either the first or the second movement of the operating part, advancing the cleaning tape T at the end of the bar-like member.

(21) The cleaning section rotating drive means 525 includes a pinion 527 disposed at the base of the bar-like member 507 or 607 and a rack 529 that engages with the pinion, disposed on the operating part 535.

(22) The winding means 545 includes:

a winding part 551 rotatably supported on a shaft 557 disposed in the housing 503, that winds the cleaning tape T, a first rotation drive plate 553 and a second rotation drive plate 555 rotatably supported on the shaft, arranged along the axis of extension of the shaft on the respective sides of the winding part, a first ratchet mechanism 559 disposed between the winding part and the first rotation drive plate, and a second ratchet mechanism 561 disposed between the winding part and the second rotation drive plate, wherein the first and second ratchet mechanisms convey to the winding part only a rotation in a first rotational direction turning around that shaft.

(23) The winding means 545 includes a movable member 575 that moves in response to movement of the operating part 535, the movable member including a first rack 571 that engages a first pinion 554 disposed on the first rotation drive plate 553 and a second rack 573 that engages a second pinion 556 disposed on the second rotation drive plate 555, the first and second racks operating in response to movement of the operating part 535, to engage the first and second pinions respectively so as to rotate the first and second rotation drive plates in mutually opposite directions.

(24) The cleaning section rotation drive means 525 includes a spring 513 or 613 connecting the pinion 527 and the bar-like member 507 or 607 respectively.

(25) The cleaning section 505 or 605 includes:

a guide sleeve 511 or 611 respectively that supports the bar-like member 507 or 607, the guide sleeve being rotatably supported in the housing 503 so as to change the angle of the axis of extension A in relation to the longitudinal axis z of the housing.

(26) The cleaning section 505 or 605 includes:

a tubular guide sleeve 511 or 611 rotatably supported in the housing; and a tubular external guide member 509 or 609 supported so as to be capable of sliding along the axis of extension A along the inner side surface of the guide sleeve and that accommodates the bar-like member 507 or 607 and the cleaning tape T such that the bar-like member and the cleaning tape are capable of sliding along the axis of extension, the bar-like member is connected to the cleaning section rotation drive means 525 via a connecting member 513 or 613 thereby enabling it to receive rotational driving force from the cleaning section rotation drive means, and the external guide member has an engaging part 509c or 609c capable of engaging with a stepped part 511a or 611a formed in the guide sleeve and is biased in the direction toward the end of the bar-like members along the axis of extension A by spring 515 or 615 disposed between the external guide member and the bar-like member such that the stepped part and the engaging part engage together.

(27) The cleaning section 605 includes:

a tubular guide sleeve 611 rotatably supported in the housing 503;

a tubular external guide member 609 supported so as to be capable of sliding along the axis of extension A in the inner side surface of the guide sleeve and that accommodates the bar-like member 607 and the cleaning tape T such that the bar-like member and the cleaning tape are capable of sliding along the axis of extension; and a rotary joint 619 supported at the base of the guide sleeve so as to be capable of rotating about the axis of extension A, that engages the base 607a of the bar-like member 607 such that the rotation joint and the bar-like member can not move relatively to each other in the circular direction in relation to that axis of extension and can slide along that axis of extension, the rotation joint means is connected to the cleaning section rotation drive means 525 via a connecting member 613 so as to receive rotational driving force from the cleaning section rotation drive means, the bar-like member has a flange 607c capable of engaging with an engaging part 621a disposed in the guide sleeve, and is biased in the direction towards the end of the bar-like member along the axis of extension by a spring 617 disposed between the bar-like member flange and the rotation joint such that the bar-like member flange engages with the engaging part, and the external guide member has a flange 609c capable of engaging with the stepped part 611a formed in the guide sleeve, and is biased in the direction towards the end of the bar-like member along the axis of extension by a spring 615 disposed between the external guide member flange and the engaging part of the guide sleeve such that the external guide member flange engages with the stepped part.

(28) The housing 503 has a long slender form.

(29) The cleaning section rotation drive means 525 is mechanically connected to the bar-like member 507 or 607 and the operating part 535, and the winding means 545 is mechanically connected to the operating part.

The optical fiber connector cleaners 1, 1F and 501 as described above have the following advantageous effects.

(1) Superior cleaning effects are obtained in a very short time and soiling does not become reattached, as the ferrule end surface of a connector is cleaned by moving and rotating fresh cleaning tape while that tape is brought into contact with the connector ferrule end surface. Further, there is no difference with respect to each cleaning operation and each operator, and unnecessarily using the cleaning tape can be avoided.

(2) The winding means and cleaning section can be rotated substantially simultaneously by a simple operation of depressing the operating part (handle), and a ferrule end surface is cleaned by rotating the cleaning tape while moving that cleaning tape.

(3) A cleaning operation can always be performed according to the same conditions as the cleaning tape is reversed in the inverse direction and the twisting of the tape is released, the cleaning tape returning to the original condition thereof, by the action of raising the operating part (handle).

(4) A guide mechanism for guiding the cleaning tape is provided, thus cleaning tape drawn out from the delivery means can be definitively advanced toward the cleaning section, enabling stable cleaning effects to be realized.

(5) As the winding means and the delivery means are rotated substantially simultaneously, even though the cleaning tape is being run while being brought into contact with a connector ferrule end surface, there is no concern that the cleaning tape may slacken and become removed from a guidepost making the running of the tape difficult. Accordingly, cleaning operations can be performed repeatedly with consistency.

(6) The cleaning section has a hollow bar-like member having a slippery member at the end thereof, thus the cleaning tape is guided along the bar-like member to definitively reach the end, and is run easily at that end.

(7) The cleaning section has a roller disposed at the end of the hollow bar-like member, therefore the cleaning tape can be made to run more smoothly with less drive force.

(8) The cleaning section has a solid bar-like member and therefore the cleaning tape can be mounted under tension more easily.

(9) The cleaning tape uses cloth that has been subject to fizz prevention processing, therefore there is no inducement to increased insertion loss as a part of the fibers do not become detached during cleaning.

(10) The cleaning tape uses woven material that has been subject to fizz prevention processing and a ferrule end surface is rubbed from a variety of directions by the texture of the weave of the woven material, thereby realizing superior cleaning effects.

(11) As the rotation of the cleaning section is performed by the engagement of a plurality of notches disposed on the operating part (handle) and a plurality of protrusions disposed on the cleaning section rotation means, a cleaner that synchronizes the running and the rotation of the cleaning tape can be easily constructed.

(12) As the rotation of the cleaning section is performed by engagement of a rack attached to the operating part (handle) with a pinion connected to the cleaning section, a cleaner that synchronizes the running and the rotation of the cleaning tape can be easily constructed.

(13) Having a configuration wherein the cleaning tape is hung on the end of an elongated inner guide member, a ferrule end surface disposed deep inside a narrow opening in a compact manner be effectively cleaned.

(14) The cleaning tape is guided by an inner guide member and an external guide member thus the tape can be run in a stable manner without becoming detached and is protected from soiling by the external guide member.

(15) The inner guide member is biased such that the inner guide member can extend and contract in relation to the housing, enabling a ferrule end surface to be consistently cleaned at a constant pressure, and there is no concern that the inner guide member contacts with the ferrule end surface mightily to damage the end surface.

(16) Even when the ferrule end surface is positioned deep within the opening, the ferrule end surface can easily be cleaned well, as the external guide member comes to contact with the edge of the opening and the inner guide member is advanced forward.

(17) Even when the ferrule end surface is inclined downwards, the cleaning section can be definitively brought up to the ferrule end surface by using the cleaning section set at an upward inclination in relation to the housing, thereby improving the cleaning effects of the cleaner and making it more user-friendly.

(18) The cleaning tape is protected from soiling as a cover is mounted on the cleaning section. Moreover, a cap is provided so that when the cleaner is not used for a long time there is protection against soiling, dust or the like entering under the cover.

(19) The cleaning section provides a cover mounted thereon with an insertion hole in the end, thus a male terminal can easily be inserted into the insertion hole and cleaning can be quickly performed.

(20) The inner guide member is positioned to the inside of the external guide member such that cleaning tape yet to be used is protected from soiling. Further, this positioning of the inner guide member prevents it from coming into contact with parts inside the connector other than the ferrule end surface during cleaning.

(21) Separate springs are provided for transmitting rotational driving force to the inner guide member and for biasing the inner guide member, thus the inner guide member can be brought into contact with a ferrule end surface at an appropriate pressure and cleaning can be properly performed without inflicting damage on the ferrule end surface.

Further, the invention is not limited by the embodiments described above, and it is realized in other various configurations by appropriately modifying the embodiments.

For example, a configuration is possible in which the first and second racks 571 and 573 form an integrated body with the operating part 535, in the winding means 545 of the third embodiment.

Experiments

The cleaning effects of the cleaner 1 will now be assessed with reference to FIGS. 25 to 28.

In experiments 1 to 3, the return loss (dB) of a ferrule end surface was tested 50 times, as to before soiling was applied to the surface, after soiling was applied and after the surface was cleaned.

Figure 25:
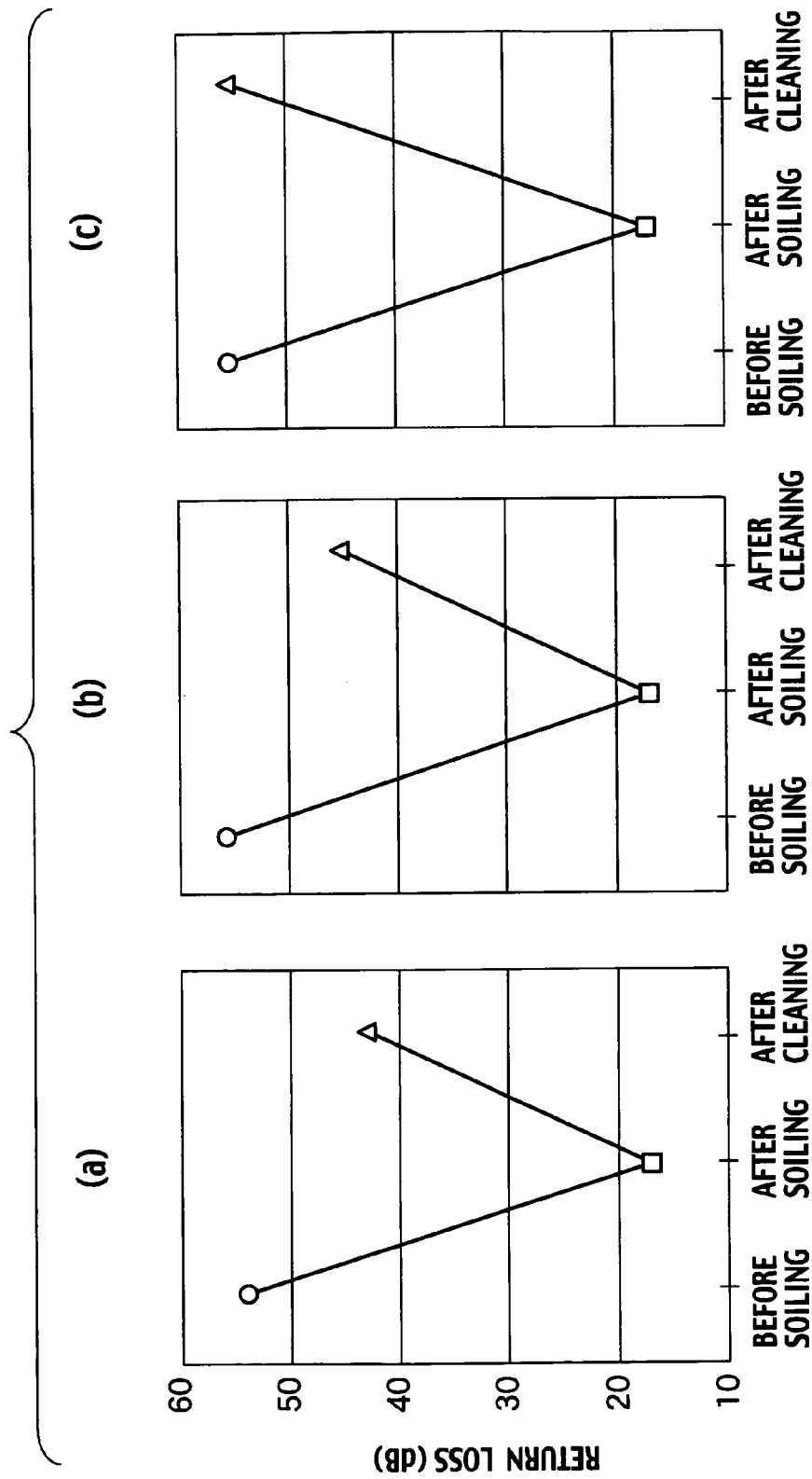
FIG. 25 is a graph showing the results of cleaning performed by the cleaner, FIG. 25 (a) showing results when the tape is rotated, FIG. 25 (b) showing results when the tape is run and FIG. 25 (c) showing results when the tape is rotated and run.
Figure 26:
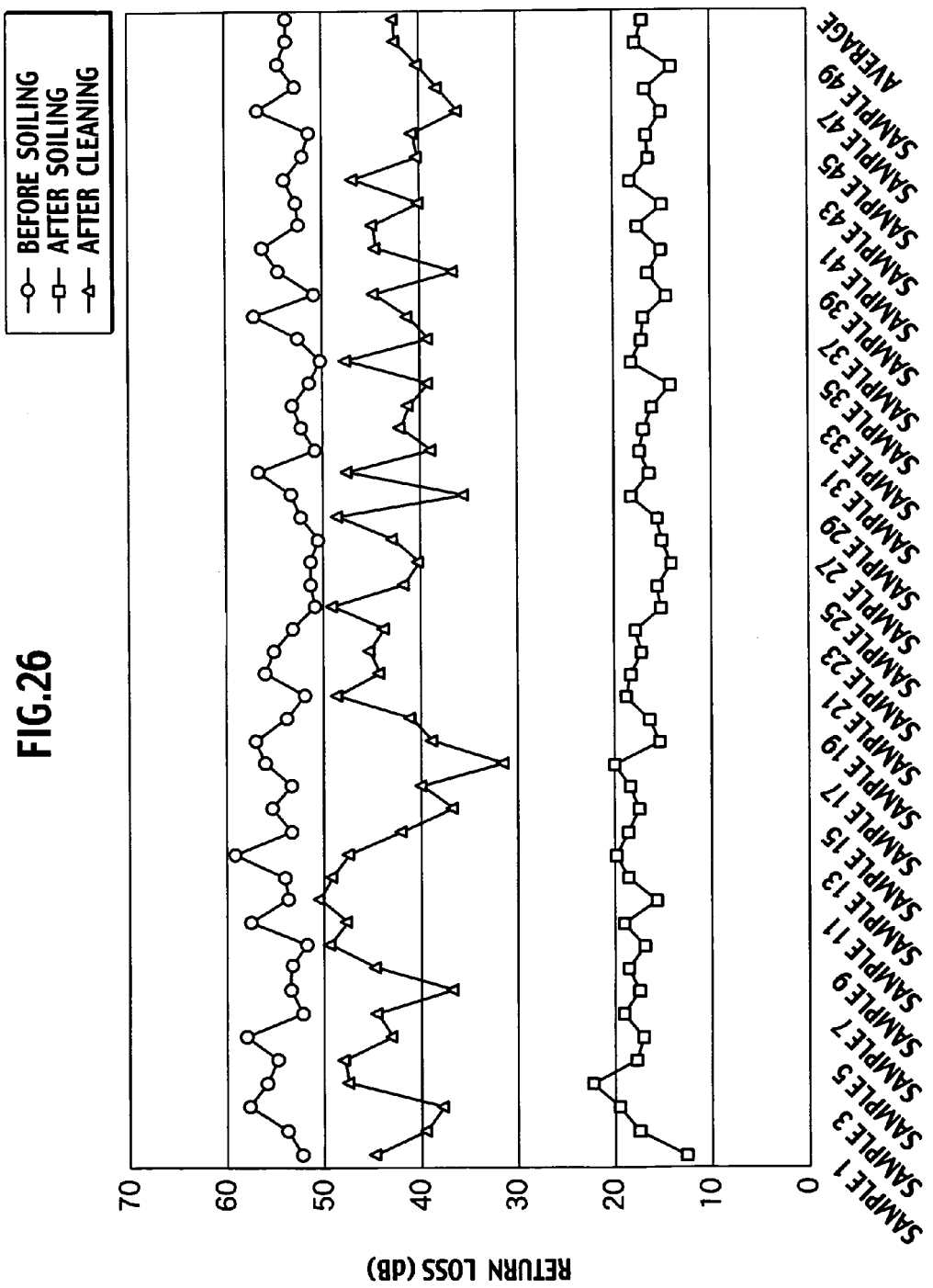
FIG. 26 is a graph showing the results of a repeated experiment for experiment 1.

In experiment 1, a cleaning tape was rotated to clean the ferrule end surface (FIG. 25 (*a*) and FIG. 26).

Figure 27:
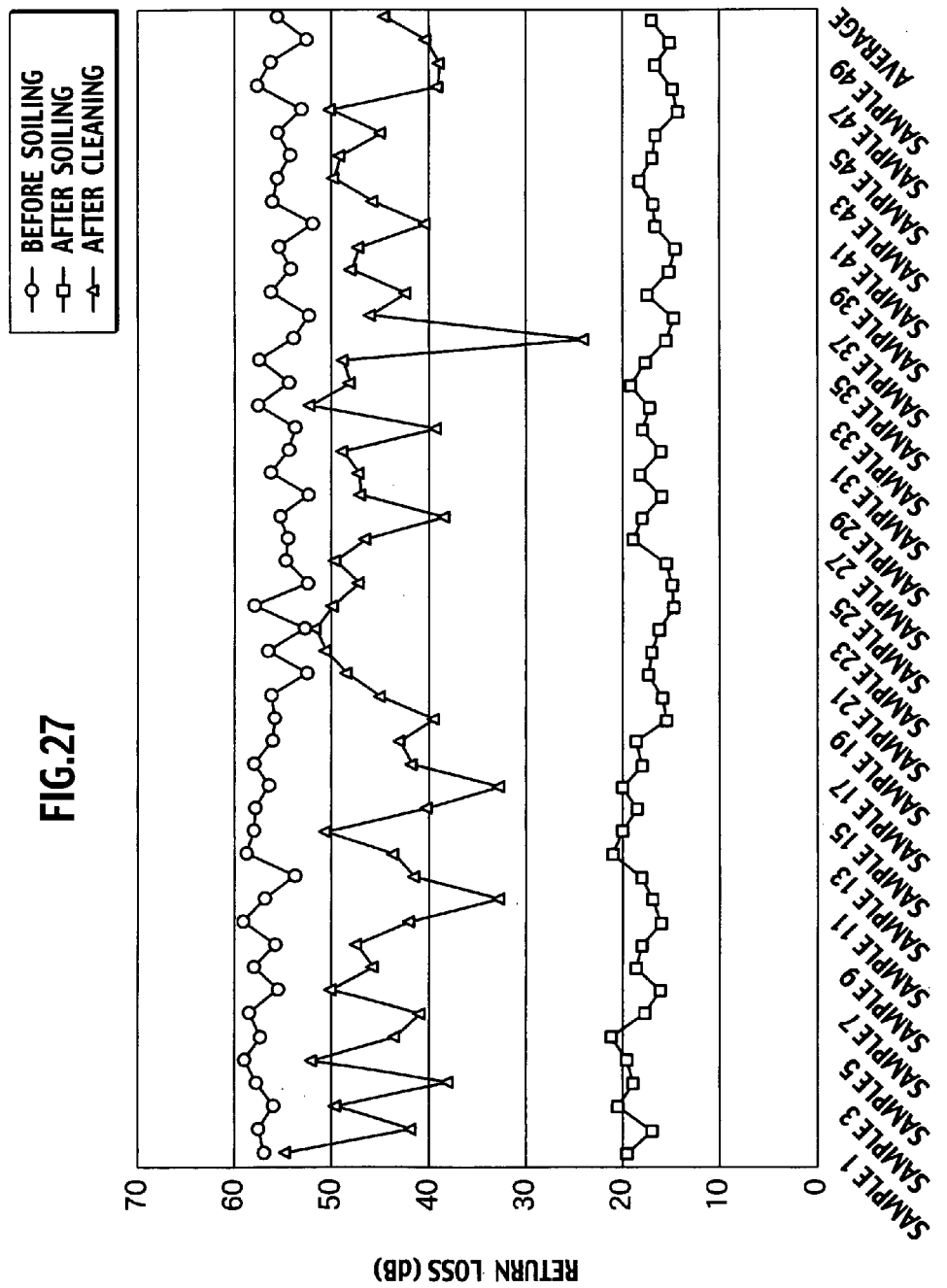
FIG. 27 is a graph showing the results of a repeated experiment for experiment 2.

In experiment 2, the tape was advanced to clean the ferrule end surface (FIGS. 25 (*b*) and FIG. 27).

Figure 28:
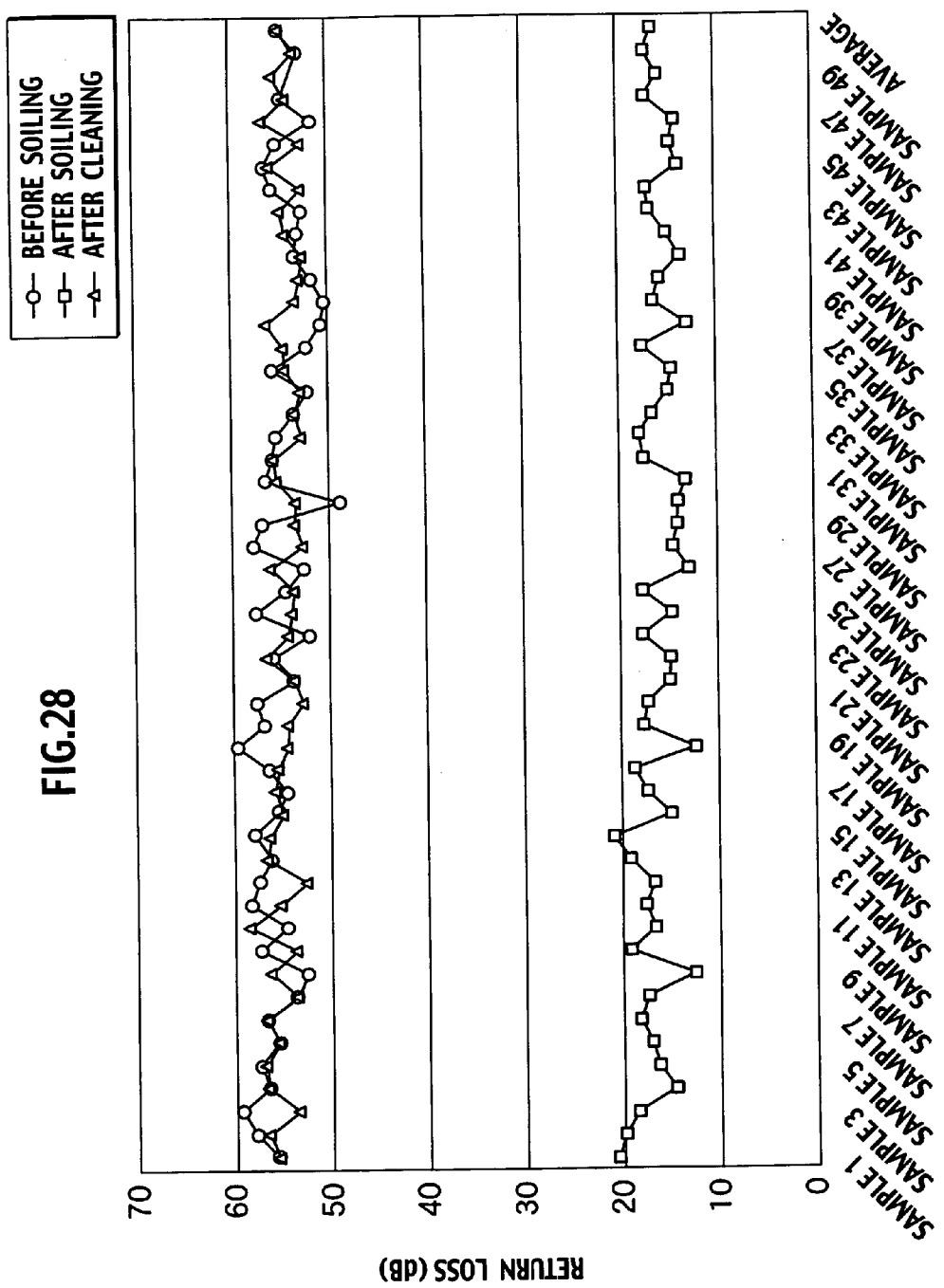
FIG. 28 is a graph showing the results of a repeated experiment for experiment 3.

In experiment 3, in the same manner as the embodiments of the invention, the tape was advanced and rotated to clean the ferrule end surface (FIG. 25(*c*) and FIG. 28).

The results show, with reference to FIG. 25, that the return loss after cleaning in experiment 1 and experiment 2 was in the range of approximately 40-45 dB. On the other hand, the return loss after cleaning in experiment 3 was approximately 55 dB and the cleaning effects in experiment 3 were improved in comparison to experiment 1 and experiment 2. Accordingly, the cleaner of the embodiments of the invention that cleans by running and rotating the cleaning tape is superior in terms of the points illustrated by the cleaning results in comparison to the case in which the cleaning tape is simply run or in which the cleaning tape is simply rotated.

INDUSTRIAL APPLICABILITY

The cleaners 1, 1F and 501 are used to clean the connection surface of an optical fiber connector incorporated in optical communications equipment. Especially when an optical fiber connector is mounted in an adapter, the connection surface of the optical fiber connector ferrule is arranged substantially inside the adapter. The cleaners 1, 1F in 501 can be applied for the cleaning of this kind of deeply positioned connection surface.

Accordingly, the cleaners 1, 1F and 501 are suitable for tests on optical communications connection equipment at time of dispatch or tests performed when making a reconnection for some reason of an optical fiber connector arranged in optical communications equipment.

The entire contents of Japanese Patent Application No. 2003-293006 filed on Aug. 13, 2003 by the same applicant, and No. 2003400172 filed on Nov. 28, 2003 by the same applicant are incorporated by reference herein.

Further, the invention is not limited by the embodiments described above, and it is realized in other various configurations by appropriately modifying the embodiments.

The invention claimed is:
1. An optical fiber connector cleaner comprising:
a housing;
a cleaning tape winding means and cleaning tape delivery means arranged inside the housing;
a cleaning means having a bar-like cleaning section projecting outwardly from the housing, on the front-end of the cleaning section a cleaning tape delivered from the delivery means being movably mounted under tension in an exposed state, the front-end of the cleaning section being brought into contact with an end surface of an optical fiber connector to thereby clean the end surface;
a cleaning section rotating means coaxially connected to the cleaning section in the housing and rotatably supported with respect to the housing; and
a transmission means which rotates the winding means and the cleaning section rotating means substantially simultaneously in a predetermined direction through a predetermined angle and then reverses the cleaning section rotating means to its original position,
wherein the transmission means includes an arm that reciprocates in a predetermined direction, and the reciprocating movement of the arm rotates the winding means and the cleaning section rotating means.

2. The optical fiber connector cleaner according to claim 1, wherein the transmission means rotates the winding means, the delivery means and the cleaning tape rotating means substantially simultaneously.

3. The optical fiber connector cleaner according to claim 1, wherein the cleaning section includes a hollow bar-like member and a smooth member arranged at the end of the bar-like member.

4. The optical fiber connector cleaner according to claim 3, wherein the main part of the cleaning section is a solid bar-like member.

5. The optical fiber connector cleaner according to claim 1, wherein the cleaning section includes a hollow bar-like member and a roller rotatably mounted at the end of that bar-like member.

6. The optical fiber connector cleaner according to claim 1, wherein the cleaning tape is cloth that has been subject to a fuzz prevention process.

7. The optical fiber connector cleaner according to claim 1, wherein the cleaning tape is a woven cloth that has been subject to a fuzz prevention process.

8. The optical fiber connector cleaner according to claim 1, wherein the arm rises and lowers in vertical direction, and the transmission means is configured such that due to the downward movement of the arm the winding means is rotated to a first angle in a first direction while simultaneously the cleaning section rotating means is rotated to a second angle in a second direction, moreover due to the upward movement of the arm the cleaning section rotating means is rotated to the second angle in the opposite direction to the second direction.

9. The optical fiber connector cleaner according to claim 8, wherein the arm of the transmission means has a plurality of notches formed along the longitudinal direction thereof, the cleaning section rotating means has a plurality of protrusions disposed on the external peripheral surface thereof, and when the arm descends the protrusions of the cleaning section rotating means are pushed down in succession by the notches on the arm and the cleaning section rotating means rotates at a determined angle in a determined direction, while when the arm ascends the protrusions of the cleaning section rotating means are pushed up in succession by the notches on the arm and the cleaning section rotating means rotates at a determined angle opposite to that determined direction.

10. The optical fiber connector cleaner according to claim 8, wherein the arm of the transmission means includes a rack having a plurality of notched grooves, the cleaning section rotating means includes a pinion having a plurality of teeth that engage with the rack, and the cleaning section rotating means rotates in a determined direction or in a direction opposite thereto in response to the ascent or decent of the arm.

11. The optical fiber connector cleaner according to claim 1, wherein the arm rises and lowers in vertical direction, and the transmission means is configured such that due to the downward movement of the arm the winding means is rotated to a first angle in a first direction while the cleaning section rotating means is rotated to a second angle in a second direction and simultaneously therewith, the delivery means is rotated in response to the rotation of the winding means, moreover due to the upward movement of the arm the cleaning section rotating means is rotated to the second angle in the opposite direction to the second direction.

12. An optical fiber connector cleaner comprising:
a housing;
a cleaning tape winding means and cleaning tape delivery means arranged inside the housing;
a cleaning means having a bar-like cleaning section projecting outwardly from the housing, on the front-end of the cleaning section a cleaning tape delivered from the delivery means being movably mounted under tension in an exposed state, the front-end of the cleaning section being brought into contact with an end surface of an optical fiber connector to thereby clean the end surface;
a cleaning section rotating means coaxially connected to the cleaning section in the housing and rotatably supported in relation to the housing;
a cleaning tape guide means coaxially connected to the cleaning section and rotatably supported in relation to the housing: and
a transmission means which rotates the winding means and the cleaning section rotating means substantially simultaneously in respective predetermined directions through respective predetermined angles and then reverses the cleaning section rotating means to its original position,
wherein the transmission means includes an arm that reciprocates in a predetermined direction, and the reciprocating movement of the arm rotates the winding means and the cleaning section rotating means.

13. An optical fiber connector cleaner comprising:
a housing of a size that can be held in one hand;
a bar-like cleaning section disposed at the end of the housing and having an axis of extension;
a winding means and a delivery means arranged inside the housing;
a cleaning tape that is wound up by the winding means after being delivered from the delivery means and being wound around the end of the cleaning section;
a cleaning section rotating means that rotates the cleaning section a determined amount about the axis of extension; and
a manual operating part that drives the cleaning section rotating means simultaneously with driving the winding means,
wherein the cleaning section includes a bar-like inner guide member around side surfaces and an end section of which the cleaning tape is arranged, and an outer side guide member that encompasses the inner guide member and the cleaning tape with the end of the inner guide member exposed, the inner guide member and the outer guide member are biased to the direction of the end of the housing, independent of each other,
wherein the operating part is reciprocable in a predetermined direction, and the reciprocating movement of the operating part drives the winding means and the cleaning section rotating means.

14. The optical fiber connector cleaner according to claim 13, wherein the cleaning section is supported at the base by a shaft disposed in the housing, and can rotate about the shaft at a determined angle in relation to the housing.

15. The optical fiber connector cleaner according to claim 13, wherein the optical fiber connector cleaner has a cover that can be attached to and removed from the cleaning section, the cover includes a tubular part having an insertion hole that can accommodate the insertion of a terminal of the male side of a connector.

16. The optical fiber connector cleaner according to claim 15, wherein the cover includes a cap that covers the insertion hole.

17. An optical fiber connector cleaner for cleaning the end surface of a ferrule of an optical fiber connector comprising:
a housing;
a cleaning section disposed at one end of the housing, said cleaning section including an inner guide member rotatably supported in the housing about the axis of extension of the inner guide member, a cleaning tape being supported at the end of the inner guide member in an exposed state so as to be capable of movement in the lengthwise direction of the cleaning tape;
a movable operating part disposed in the housing;
a cleaning section rotation drive means that is connected to the inner guide member and the operating part and rotates the inner guide member about the axis of extension in response to movement of the operating part; and
a winding means that is connected to the operating part, that winds the cleaning tape in response to movement of the operating part and that advances the cleaning tape at the end of the inner guide member,
wherein the operating part is reciprocable in a predetermined direction, and the reciprocating movement of the operating part drives the winding means and the cleaning section rotating means.

18. The optical fiber connector cleaner according to claim 17, wherein the cleaning section rotating drive means rotates the inner guide member in the forward direction of the rotation of the axis of extension in response to a first movement of the operating part and rotates the inner guide member in the backward direction returning the inner guide member to their original position in response to a second movement of the operating part,
wherein the winding means has a winding part rotatably supported in the housing that winds the cleaning tape, this winding part rotating in a predetermined direction to wind the cleaning tape in response to either the first or the second movement of the operating part, advancing the cleaning tape at the end of the inner guide member.

19. The optical fiber connector cleaner according to claim 17, wherein the cleaning section rotating drive means includes a pinion disposed at the base of the inner guide member and a rack that engages with the pinion, disposed on the operating part.

20. The optical fiber connector cleaner according to claim 19, wherein the cleaning section rotation drive means includes a spring connecting the pinion and the inner guide member respectively.

21. The optical fiber connector cleaner according to claim 17, wherein the winding means includes:
a winding part rotatably supported on a shaft disposed in the housing, that winds the cleaning tape, a first rotation drive plate and a second rotation drive plate rotatably supported on the shaft, arranged along the axis of extension of the shaft on the respective sides of the winding part, a first ratchet mechanism disposed between the winding part and the first rotation drive plate, and a second ratchet mechanism disposed between the winding part and the second rotation drive plate, wherein the first and second ratchet mechanisms convey to the winding part only a rotation in a first rotational direction turning around that shaft.

22. The optical fiber connector cleaner according to claim 21, wherein the winding means includes a movable member that moves in response to movement of the operating part, the movable member including a first rack that engages a first pinion disposed on the first rotation drive plate and a second rack that engages a second pinion disposed on the second rotation drive plate, the first and second racks operating in response to movement of the operating part, to engage the first and second pinions respectively so as to rotate the first and second rotation drive plates in mutually opposite directions.

23. The optical fiber connector cleaner according to claim 17, wherein the cleaning section includes:

a guide sleeve respectively that supports the inner guide member, the guide sleeve being rotatably supported in the housing so as to change the angle of the axis of extension in relation to the longitudinal axis of the housing.

24. The optical fiber connector cleaner according to claim 17, wherein the cleaning section includes:

a tubular guide sleeve rotatably supported in the housing; and a tubular external guide member supported so as to be capable of sliding along the axis of extension along the inner side surface of the guide sleeve and that accommodates the inner guide member and the cleaning tape such that the inner guide member and the cleaning tape are capable of sliding along the axis of extension, the inner guide member is connected to the cleaning section rotation drive means via a connecting member thereby enabling it to receive rotational driving force from the cleaning section rotation drive means, and the external guide member has an engaging part capable of engaging with a stepped part formed in the guide sleeve and is biased in the direction toward the end of the inner guide members along the axis of extension by spring disposed between the external guide member and the inner guide member such that the stepped part and the engaging part engage together.

25. The optical fiber connector cleaner according to claim 17, wherein the cleaning section includes:

a tubular guide sleeve rotatably supported in the housing;

a tubular external guide member supported so as to be capable of sliding along the axis of extension in the inner side surface of the guide sleeve and that accommodates the inner guide member and the cleaning tape such that the inner guide member and the cleaning tape are capable of sliding along the axis of extension; and a rotary joint supported at the base of the guide sleeve so as to be capable of rotating about the axis of extension, that engages the base of the inner guide member such that the rotation joint and the inner guide member cannot move relatively to each other in the circular direction in relation to that axis of extension and can slide along that axis of extension, the rotation joint is connected to the cleaning section rotation drive means via a connecting member so as to receive rotational driving force from the cleaning section rotation drive means, the inner guide member has a flange capable of engaging with an engaging part disposed in the guide sleeve, and is biased in the direction towards the end of the along the axis of extension by a spring disposed between the inner guide member flange and the rotation joint such that the inner guide member flange engages with the engaging part, and the external guide member has a flange capable of engaging with the stepped part formed in the guide sleeve, and is biased in the direction towards the end of the inner guide member along the axis of extension by a spring disposed between the external guide member flange and the engaging part of the guide sleeve such that the external guide member flange engages with the stepped part.

26. The optical fiber connector cleaner according to claim 17, wherein the housing has a long slender form.

27. The optical fiber connector cleaner according to claim 17, wherein the cleaning section rotation drive means is mechanically connected to the inner guide member and the operating part, and the winding means is mechanically connected to the operating part.

* * * * *